United States Patent
Chehreghani

(10) Patent No.: US 10,073,887 B2
(45) Date of Patent: Sep. 11, 2018

(54) SYSTEM AND METHOD FOR PERFORMING K-NEAREST NEIGHBOR SEARCH BASED ON MINIMAX DISTANCE MEASURE AND EFFICIENT OUTLIER DETECTION

(71) Applicant: Conduent Business Services, LLC, Dallas, TX (US)

(72) Inventor: Morteza Chehreghani, Montbonnot-St-Martin (FR)

(73) Assignee: Conduent Business Services, LLC, Dallas, TX (US)

( * ) Notice: Subject to any disclaimer, the term of this patent is extended or adjusted under 35 U.S.C. 154(b) by 574 days.

(21) Appl. No.: 14/791,869

(22) Filed: Jul. 6, 2015

(65) Prior Publication Data
US 2017/0011091 A1    Jan. 12, 2017

(51) Int. Cl.
*G06F 17/30* (2006.01)
*G06F 7/00* (2006.01)

(52) U.S. Cl.
CPC .. *G06F 17/30477* (2013.01); *G06F 17/30312* (2013.01)

(58) Field of Classification Search
CPC ......... G06F 17/30864; G06F 17/30867; G06F 17/30286; G06F 17/30595
USPC ...................................................... 707/769
See application file for complete search history.

(56) References Cited

U.S. PATENT DOCUMENTS

| 5,442,778 A * | 8/1995 | Pedersen ........... G06F 17/30011 |
| 2012/0045134 A1 | 2/2012 | Perronnin et al. |
| 2012/0076401 A1 | 3/2012 | Sanchez et al. |
| 2014/0317019 A1 * | 10/2014 | Papenbrock .......... G06Q 40/06 705/36 R |
| 2015/0254370 A1 * | 9/2015 | Sexton ............. G06F 17/30958 707/798 |

OTHER PUBLICATIONS

U.S. Appl. No. 14/616,032, filed Feb. 6, 2015, Chehreghani.
Chebotarev, "A class of graph-geodetic distances generalizing the shortest-path and the resistance distances" Discrete Appl. Math., vol. 159(5), pp. 295-302 (2011).
Cortes, et al., "Support-vector networks," Mach. Learn., vol. 20(3), pp. 273-297 (1995).

(Continued)

*Primary Examiner* — Usmaan Saeed
*Assistant Examiner* — Raquel Perez-Arroyo
(74) *Attorney, Agent, or Firm* — Fay Sharpe LLP

(57) ABSTRACT

A system and method enable a set of dataset objects that are K-nearest neighbors (K-NN), based on their Minimax distances to a test object, to be identified without computing the all-pair Minimax distances directly. A pairwise distance between the test object and each dataset object is computed. Iteratively, one of the dataset objects is selected to add to a K-NN set until the K-NN set includes a predefined number of nearest neighbors. The selected dataset object at each iteration is the one for which there is no other unselected dataset object which has a smaller pairwise distance to any of a current subset of objects than the selected dataset object. The current subset of objects includes the test object and the dataset objects currently in the K-NN set. After the K-NN set is identified it may be output or used to generate other information, such as a test object label.

21 Claims, 26 Drawing Sheets

(56) References Cited

OTHER PUBLICATIONS

Chang, et al., "Robust path-based spectral clustering," Pattern Recogn., vol. 41(1), pp. 191-203 (2008).
Dijkstra, "A note on two problems in connexion with graphs," Numerische Mathematik, vol. 1, pp. 269-271 (1959).
Fischer, et al. "Path-based clustering for grouping of smooth curves and texture segmentation," IEEE Trans. Pattern Anal. Mach. Intell., vol. 25(4), pp. 513-518, (2003).
Fouss, et al., "Random-walk computation of similarities between nodes of a graph with application to collaborative recommendation," IEEE Trans. on Knowl. and Data Eng., vol. 19(3), pp. 355-369 (2007).
Fouss, et al., "An experimental investigation of kernels on graphs for collaborative recommendation and semisupervised classification," Neural Networks, vol. 31, pp. 53-72 (2012).
Gabow, et al., "Efficient algorithms for finding minimum spanning trees in undirected and directed graphs," Combinatorica, vol. 6(2), pp. 109-122 (1986).
Hofmann, et al., "A review of kernel methods in machine learning," Technical Report No. 156, Max Planck Institute for Biological Cybernetics, pp. 1-52 (2006).
Hu, "The maximum capacity route problem," Operations Research, vol. 9, pp. 898-900, (1961).
Kim, et al., "Neighbor search with global geometry: a Minimax message passing algorithm," ICML, pp. 401-408 (2007).
Kim et al., "Walking on Minimax paths for κ-NN search," Proc. 27th AAAI Conf. on Artificial Intelligence, pp. 518-525 (2013).
Kruskal, "On the Shortest Spanning Subtree of a Graph and the Traveling Salesman Problem," Proc. Am. Mathematical Soc., 7, pp. 48-50 (1956).
Kschischang, et al., "Factor graphs and the sum-product algorithm," IEEE Trans. Inf. Theor., vol. 47(2), pp. 498-519 (2006).
Luo, et al., "A collaborative filtering framework based on both local user similarity and global user similarity," Mach. Learn., vol. 72(3), pp. 231-245 (2008).
Perronnin, et al., "Improving the fisher kernel for large-scale image classification," Proc. 11$^{th}$ European Conference on Computer Vision (ECCV): Part IV, pp. 143-156 (2010).
Perronnin, et al., "Fisher kernels on visual vocabularies for image categorization" in CVPR 2007, pp. 1-8 (2007).
Prim, "Shortest connection networks and some generalizations," The Bell System Technical Journal, vol. 36(6), pp. 1389-1401 (1957).
Sánchez, et al., "High-dimensional signature compression for large-scale image classification," in CVPR 2011, pp. 1665-1672 (2011).
Sánchez, et al., "Image classification with the Fisher vector: Theory and practice," IJCV, vol. 105(3), pp. 222-245 (2013).
Shawe-Taylor, et al., "Kernel Methods for Pattern Analysis," Cambridge University Press, pp. 1-12 (2004).
Tenenbaum, et al., "A global geometric framework for nonlinear dimensionality reduction," Science, vol. 290(5500), pp. 2319-2323 (2000).
Weinberger, et al., "Distance metric learning for large margin nearest neighbor classification," J. Mach. Learn. Res., vol. 10, pp. 207-244 (2009).
Yen, et al., "A family of dissimilarity measures between nodes generalizing both the shortest-path and the commute-time distances," KDD, pp. 785-793 (2008).
Zadeh, et al., "A uniqueness theorem for clustering," Uncertainty in Artificial Intelligence (UAI), pp. 639-646 (2009).

\* cited by examiner

NOT OUTLIER

SYSTEM AND METHOD FOR PERFORMING K-NEAREST NEIGHBOR SEARCH BASED ON MINIMAX DISTANCE MEASURE AND EFFICIENT OUTLIER DETECTION

BACKGROUND

The exemplary embodiment relates to graphical representations of data and finds particular application in connection with the identification of nearest neighbors to a given data point, based on Minimax distances and for detection of whether the data point is an outlier.

Identifying the appropriate data representation plays a key role in machine learning tasks, both in supervised and unsupervised learning methods. Different data representations can be generated, depending on the choice of distance measure. Examples of distance measures that are commonly used include the (squared) Euclidean distance, Mahalanobis distance, cosine similarity, Pearson correlation, and Hamming and edit distances. Such distances often make explicit or implicit assumptions about the underlying structure in the data. For example, squared Euclidean distance assumes that the data stays inside a (multidimensional) sphere, while the Pearson correlation is only suitable for temporal and sequential data.

However, in many applications, the structure of the data is often very complex, folded and a priori unknown. Therefore, any fixed assumption about the data can easily fail, which means there is a high potential for model mismatch, under-fitting or over-fitting. Thus, it is often helpful to enrich the basic data representation with a meta representation which is more flexible in identifying the structure. One approach is to use a kernel (see, e.g., Shawe-Taylor, et al., "Kernel Methods for Pattern Analysis," Cambridge University Press, 2004; and Hofmann, et al., "A review of kernel methods in machine learning," Technical Report No. 156, Max Planck Institute for Biological Cybernetics, pp. 1-52, 2006). However, the choice of an appropriate kernel as well as its computational complexity, restrict the use of this approach.

One category of distance measures, so-called link-based measures, take into account all the routes between the objects represented in a graph (see, Fouss, et al., "Random-walk computation of similarities between nodes of a graph with application to collaborative recommendation," IEEE Trans. on Knowl. and Data Eng., 19(3):355-369, 2007, hereinafter, "Fouss 2007"; Chebotarev, "A class of graph-geodetic distances generalizing the shortest-path and the resistance distances" Discrete Appl. Math., 159(5):295-302, 2011). The route-specific distance between nodes i and j can be computed by summing the edge weights on the route (Yen, et al., "A family of dissimilarity measures between nodes generalizing both the shortest-path and the commute-time distances," KDD, pp. 785-793, 2008, hereinafter, Yen 2008). Yen's link-based distance is then obtained by summing up the route-specific measures of all routes between them. Such a distance measure can generally capture arbitrarily-shaped structures better than basic measures, such as the Euclidean and Mahalanobis distances. Link-based measures are often obtained by inverting the Laplacian of the distance matrix, done in the context of a regularized Laplacian kernel and a Markov diffusion kernel (Yen 2008; Fouss, et al., "An experimental investigation of kernels on graphs for collaborative recommendation and semisupervised classification," Neural Networks, 31:53-72, 2012, hereinafter, "Fouss 2012"). However, computing all pairs of link-based distances entails inverting a N×N matrix, which yields a running time $\mathcal{O}(N^3)$. It is thus not suited to large-scale datasets.

Another distance measure, called the Minimax measure, selects the minimum largest gap among all possible routes between the two objects. This measure, also known as the "Path-based distance measure," has been proposed for improving clustering results (Fischer, et al. "Path-based clustering for grouping of smooth curves and texture segmentation," IEEE Trans. Pattern Anal. Mach. Intell., 25(4): 513-518, 2003, hereinafter, "Fischer 2003). It has also been proposed as an axiom for evaluating clustering methods (Zadeh, et al., "A uniqueness theorem for clustering," Uncertainty in Artificial Intelligence (UAI), pp. 639-646, 2009). A straightforward approach to compute all-pairs Minimax distances is to use an adapted variant of the Floyd-Warshall algorithm. The running time of this algorithm is $\mathcal{O}(N^3)$ (Aho, et al., "The Design and Analysis of Computer Algorithms," Addison-Wesley Longman Publishing Co., Inc., Boston, Mass., USA, 1st edition, 1974; Cormen, et al., "Introduction to Algorithms," McGraw-Hill Higher Education, 2nd edition, 2001). This distance measure is also integrated with an adapted variant of K-means yielding an agglomerative algorithm whose running time is $O(N^2|E|+N^3 \log N)$ (Fischer 2003). The Minimax distance has been proposed for K-nearest neighbor searching.

The standard method (using, for example, the Euclidean distance), the metric learning approach (Weinberger, et al., "Distance metric learning for large margin nearest neighbor classification," J. Mach. Learn. Res., 10:207-244, 2009), and shortest path distance (Dijkstra, "A note on two problems in connexion with graphs," Numerische Mathematik, 1:269-271, 1959, hereinafter, Dijkstra, 1959", Tenenbaum, et al., "A global geometric framework for nonlinear dimensionality reduction," Science, 290(5500):2319-23, 2000) can all give poor results, e.g., on non-convex data, since they ignore the underlying geometry.

Kim, et al., "Neighbor search with global geometry: a Minimax message passing algorithm," ICML, pp. 401-408, 2007, hereinafter, "Kim 2007" proposes a message passing algorithm with forward and backward steps, similar to the sum-product algorithm described in Kschischang, et al., "Factor graphs and the sum-product algorithm," IEEE Trans. Inf. Theor., 47(2):498-519, 2006. The method takes $\mathcal{O}(N)$ time, which is in theory equal to the standard K-nearest neighbor search, but the algorithm needs many more visits of the training dataset. Moreover, this method entails computing a minimum spanning tree (MST) in advance which may take $\mathcal{O}(N^2)$ time. Another algorithm is described in Kim, et al., "Walking on Minimax paths for k-NN search," Proc. 27th AAAI Conf. on Artificial Intelligence, pp. 518-525, 2013, hereinafter, "Kim 2013." The greedy algorithm proposed in Kim 2013 computes K-nearest neighbors by space partitioning and using Fibonacci heaps whose run time is $\mathcal{O}(\log N+K \log K)$. However, this method is limited to Euclidean spaces and assumes the graph is sparse.

The exemplary embodiment provides a system and method for K-nearest neighbor searching based on Minimax distances that is computationally efficient and applicable to a wide range of base distance measures.

INCORPORATION BY REFERENCE

The following application, the disclosure of which is incorporated in its entirety by reference, is mentioned:

U.S. application Ser. No. 14/616,032, filed Feb. 6, 2015, entitled EFFICIENT CALCULATION OF ALL-PAIR PATH-BASED DISTANCE MEASURES, by Morteza Chehreghani.

BRIEF DESCRIPTION

In accordance with one aspect of the exemplary embodiment, a method for identifying a set of (Minimax) nearest neighbors includes receiving a test object. For each of a set of dataset objects, the method includes computing a pairwise distance between the test object and the dataset object. The dataset objects and test object are represented by nodes of a graph. Edges of the graph represent pairwise distances between respective pairs of the objects. The method further includes iteratively selecting one of the dataset objects to add to a set of nearest neighbors until the set of nearest neighbors includes a predefined number of nearest neighbors. The selected dataset object, at each iteration, is a dataset object which is not currently in the set of nearest neighbors and for which there is no other dataset object not currently in the set of nearest neighbors which has a smaller pairwise distance to any of a subset of objects than the selected dataset object. The subset of objects includes the test object and the dataset objects currently in the set of nearest neighbors. At least one of the set of nearest neighbors and information based on the set of nearest neighbors is output.

One or more of the steps of the method may be performed with a processor.

In accordance with another aspect of the exemplary embodiment, a system for identifying a set of Minimax nearest neighbors includes a graph generation component which, for each of a set of dataset objects, computes a pairwise distance between a test object and the dataset object. An extension component iteratively selects one of the dataset objects to add to a set of nearest neighbors until the set of nearest neighbors includes a predefined number of nearest neighbors. The selected dataset object at each iteration is a dataset object which is not currently in the set of nearest neighbors for which there is no other dataset object not currently in the set of nearest neighbors which has a smaller pairwise distance to any of a subset of objects than the selected dataset object. The subset of objects includes the test object and the dataset objects currently in the set of nearest neighbors. An output component outputs the set of nearest neighbors and/or information based thereon. A processor implements the graphing component and the extension component.

In accordance with another aspect of the exemplary embodiment, a method is provided for identifying a set of nearest neighbors which have Minimax distances to a test object. The method includes, for each of a set of dataset objects in which each pair of the dataset objects is associated with a pairwise distance, computing a pairwise distance between a test object and the dataset object. For a predefined number of iterations, the method includes iteratively selecting one of the dataset objects to add to a set of nearest neighbors until the set of nearest neighbors includes the predefined number of nearest neighbors. The selected dataset object at each iteration is a dataset object which is not currently in the set of nearest neighbors for which there is no other dataset object not currently in the set of nearest neighbors which has a smaller pairwise distance to any of a subset of objects than the selected dataset object. The subset of objects includes the test object and the dataset objects currently in the set of nearest neighbors. The set of nearest neighbors and/or a prediction of whether the test object is an outlier with respect to the set of dataset objects is output.

One or more of the steps of the method may be performed with a processor.

DETAILED DESCRIPTION

The exemplary embodiment relates to a method and system for K-nearest neighbor search and classification based on the Minimax distance measure. Particularly on large and convoluted datasets, the use of this distance measure can improve the classification results.

In various aspects of the present method, an efficient Minimax K-nearest neighbor search algorithm is disclosed which has a reduced computation time. In particular, the method can perform fewer visits of the training set than in Kim 2007. It can also avoid the need to compute a minimum spanning tree ("MST") in advance. Unlike Kim 2013, the method can also be applied to arbitrary distances. The system and method use an iterative approach to add members to the nearest neighbor set in a way which has a high accuracy while being computationally efficient.

In some embodiments, the system and method predict whether a data point representing a new (out-of-sample) test object is an outlier with respect to the dataset from which the nearest neighbors are identified. An efficient method for outlier detection while performing K-nearest neighbor search is disclosed. In particular, edges representing the Minimax distances are analyzed. The specific position of these edges provides useful information on the possibility of being an outlier, or belonging to a new class (source). An advantage of the method is that it entails little extra computation and the algorithm, similar to the Minimax K-nearest neighbor search algorithm, is linear.

Figure 1:
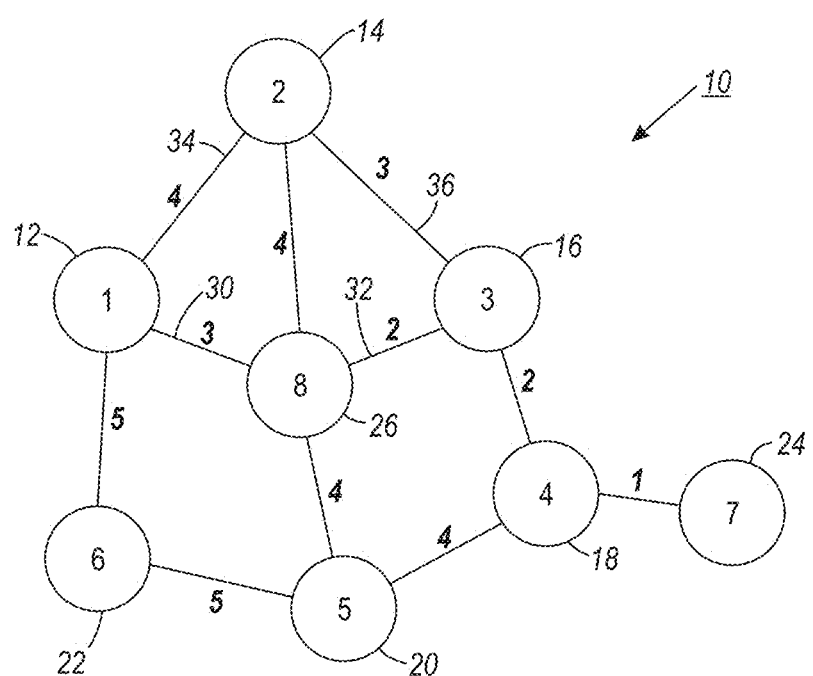
FIG. 1 is a simple example of a graph including nodes representing objects and edges representing distances between them.

A simplified graph 10 is shown in FIG. 1 for illustrative purposes. The graph includes a set of nodes 12, 14, 16, 18, 20, 22, 24, 26. Each node represents a respective data point which is a vectorial representation of a dataset object. Objects in the dataset can be text documents, images, objects having a set of attributes or properties (such as animals, personal profiles), or any other type of object which can be represented by a vector. Each index of the vector includes a value for a respective one of a set of dimensions.

In the graph, pairs of the nodes are connected by edges, such as edges 30, 32, 34 and 36. Each edge terminates in one node at a first end and terminates in another (different) node at a second end of the edge. A weight is assigned to each edge, which can be considered to represent the distance (or cost) between the two nodes in the pair. For example, edge 30 is associated with a weight of 3 and edge 32 with a weight of 2. Distances between the connected pairs of nodes can be computed by any suitable distance measure, such as one based on the cosine similarity, the (squared) Euclidean distance, Mahalanobis distance, Pearson correlation, Hamming distance, edit distance, or any other distance measure used for computing distances between the two vectors (other than the Minimax distance). For simplicity, the weights assigned to the edges using, for example, such distance measures, are referred to herein as pairwise distances. A route (path) between two nodes includes one or more of the edges. For example, a first path between nodes 12 and 16 consists of edges 30 and 32, while a second path between these nodes consists of edges 34 and 36.

The Minimax distance between two nodes is computed along only one path, the Minimax path between the nodes. The Minimax path is the path that has the smallest maximum gap, i.e., the path whose maximum pairwise distance along the path is the smallest. Thus, for example, for the first path between nodes 12 and 16, the largest gap (pairwise distance) between any two nodes on the path is 3 (between nodes 12 and 26), while for the second path it is 4. The Minimax path in this case is therefore the first path (traversing edges 30 and 32) as it has the smallest maximum gap (3). The Minimax distance between nodes 12 and 16 is therefore the weight of the largest gap (highest pairwise distance) of the first path, i.e., 3. As will be appreciated, there are other paths between the two nodes 12 and 16 of the graph, but is assumed for this illustration that all have a higher maximum gap. Thus, the Minimax distance between two nodes is the pairwise distance of only a single one of the edges along the path, irrespective of how many intermediate nodes there are. For example, the Minimax distance between the two nodes 12 and 24 in FIG. 1 is also 3, even though it is longer, in terms of the sum of its pairwise distances, than between nodes 12 and 16. As will be appreciated, the graph 10 may be stored in memory as any suitable data structure.

In embodiments disclosed herein, an efficient and general-purpose algorithm is used for identifying a set of K nearest neighbors to a new data point from a dataset of objects, based on Minimax distances. The algorithm has a significantly lower runtime and is applicable with arbitrary distances, giving it advantages over existing methods. Its connection to minimum spanning trees is discussed below, particularly the Prim's algorithm (Prim, "Shortest connection networks and some generalizations," The Bell System Technical Journal, 36(6):1389-1401, 1957, hereinafter Prim). Performance of the algorithm on a variety of real-world datasets is also evaluated, such as text documents and images, and the results compared with alternative methods. The Minimax K-nearest neighbor approach is able to capture the underlying data geometry well, yielding high accuracies and also being scalable to large data sets.

Figure 2:
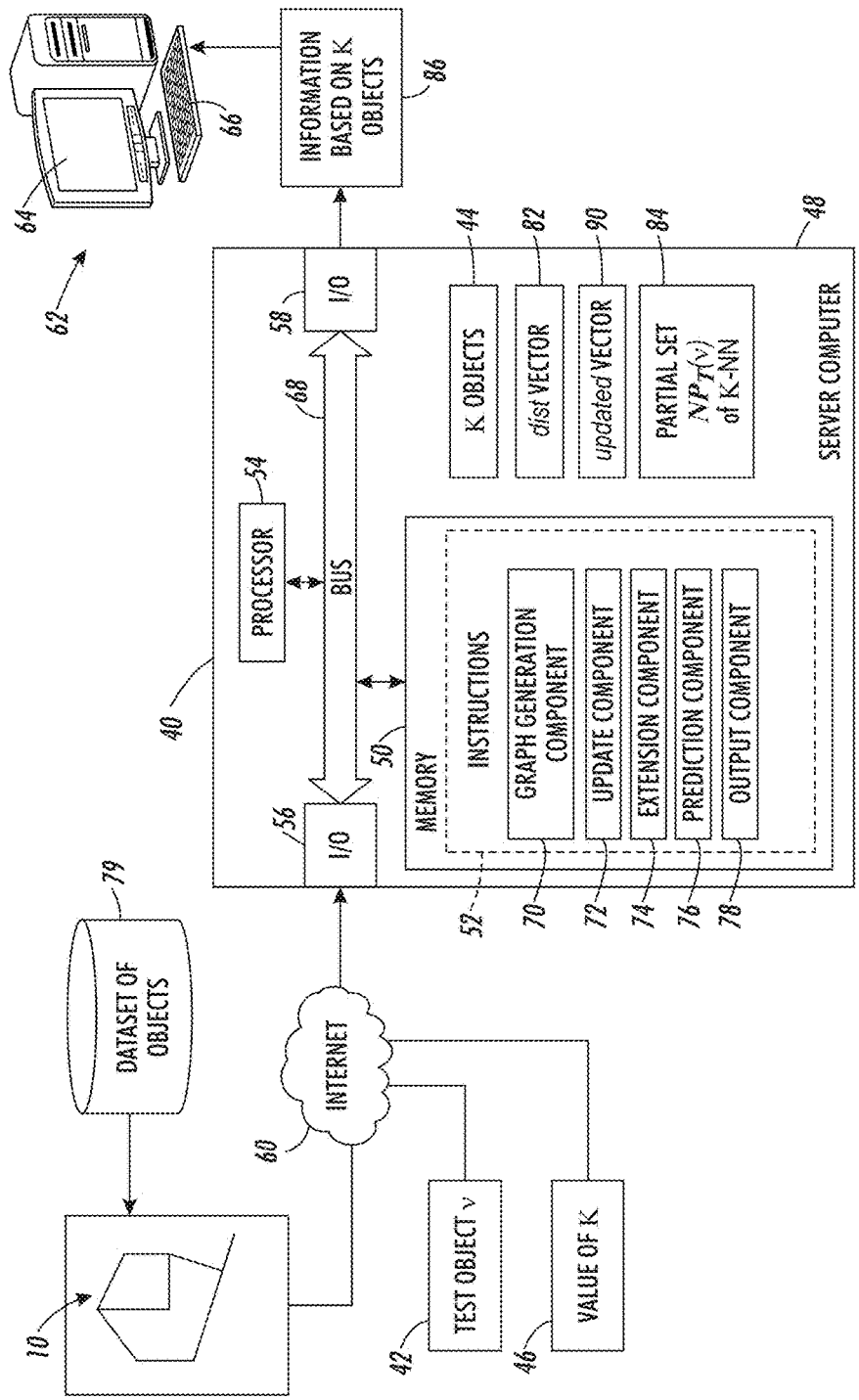
FIG. 2 is a functional block diagram of a system for identification of a set of nearest neighbors based on Minimax distance.

With reference also to FIG. 2, a functional block diagram of a computer-implemented system 40 for K-nearest neighbor (K-NN) search based on Minimax distances is shown. The system 40 takes as input a data set representing objects, which may already be in the form of a graph 10, or the system may generate the graph 10 based on a suitable distance measure, such as one of those described above. In the illustrative input graph 10 shown in FIG. 1, only a few edges are shown. In practice, each node may be connected to every other node by a respective edge. In cases where the input graph 10 includes fewer than all possible edges (a sparse graph), a full graph can be generated by adding an artificial edge to the graph 10 for each unconnected pair of nodes, and giving it a maximum weight (higher than the pairwise distances initially assigned to any of the pairs of nodes in the input graph, such as an infinite weight). The rest of the pairwise distance between respective pairs of the dataset objects are computed with a same distance measure as pairwise distances between a test object 42 and the dataset objects.

Given the input graph 10 representing dataset objects and an out-of-sample test object (node) 42 denoted v (FIGS. 3 and 4), the system aims to obtain a set 44 of K dataset objects represented in the graph 10 whose Minimax distances from v are not larger than for the other objects of graph. As an example, the node v may be an unlabeled node whose label is to be predicted (or its existing label verified), based on the labels of its K-nearest neighbors in the graph. The dataset nodes numbered 1-8 in the graph 10 may thus each have an associated label (or labels) which may be drawn from a finite set of labels, or a probability distribution over the set of labels. A value 46 of K (the number of nearest neighbors to be identified) may also be input to the system or may be predefined or generated by the system, e.g., based on the number of dataset objects represented in the graph 10.

The dataset labels may have been manually applied to at least some of the dataset objects. For example, in the case of text objects the labels could be different types of forms. In the case of mail items, the labels could represent different processing departments to which the documents are routed for processing. In the context of litigation, the labels could whether the documents are responsive or not responsive to a discovery request, or the like. In the case of news items, the labels may represent topic clusters. In the case of images, the labels may represent different classes of visual objects, such as different classes of animals, birds, plants, buildings, vehicles, combinations thereof, or the like.

The computer system 40 may be resident on one or more computing devices 48 and includes memory 50, which stores instructions 52 for performing the exemplary method, and a processor 54, in communication with the memory 50, which executes the instructions. In particular, the processor 54 executes instructions for performing the method outlined in FIG. 5. Computer system 40 also includes one or more network and/or user interfaces 56, 58 for communication with external devices. The input/output (I/O) interface 56 may receive as input the graph 10 and/or a set of data points via a wired or wireless connection 60, such as the Internet. The I/O interface 58 may communicate with a user interface 62 which may include one or more of a display device 64, for displaying information to users, and a user input device 66 for inputting text and for communicating user input information and command selections to the processor. The user input device may include one or more of a keyboard, keypad, touch screen, writable screen, and a cursor control device, such as mouse, trackball, or the like. The user interface 62 may be a separate computer device or the display device 64 and user input device 66 may communicate directly with the computer 48.

The various hardware components 50, 54, 56, 58 of the computer system 40 may all be communicatively connected by a data/control bus 68.

The exemplary instructions 52 include an optional graph generation component 70, an update component 72, an extension component 74, an optional prediction component 76, and an output component 78.

If not already done, the graph generation component 70 generates a graph 10 from an input dataset 79 of objects, such as vectorial representations of text documents or images. This may include computing weights for some or all of the edges 30, 32, 34, 36, etc. of the graph.

Figure 3:
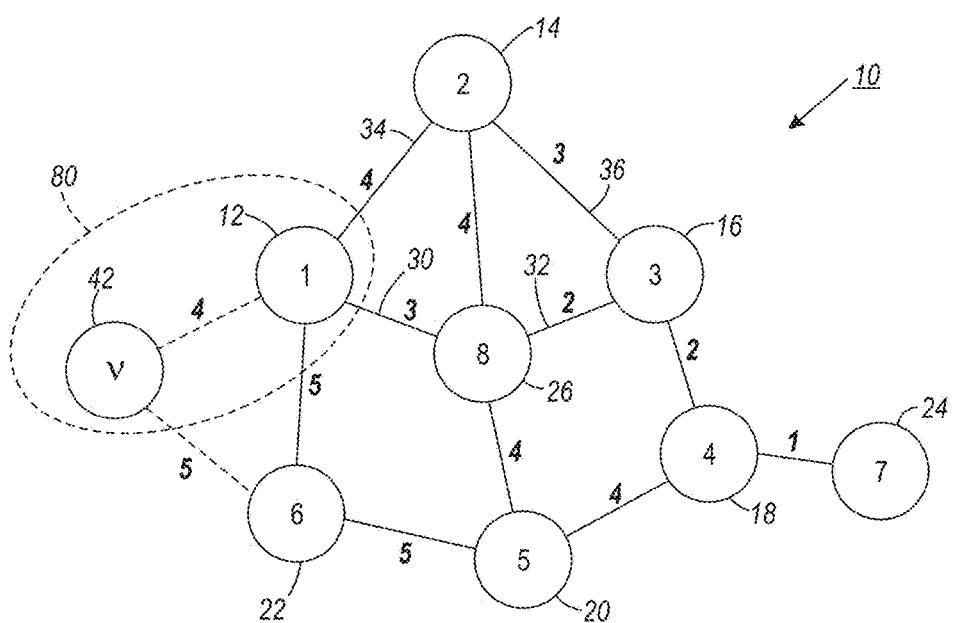
FIG. 3 illustrates the identification of a first neighbor to a new node v, in the graph of FIG. 1.
Figure 4:
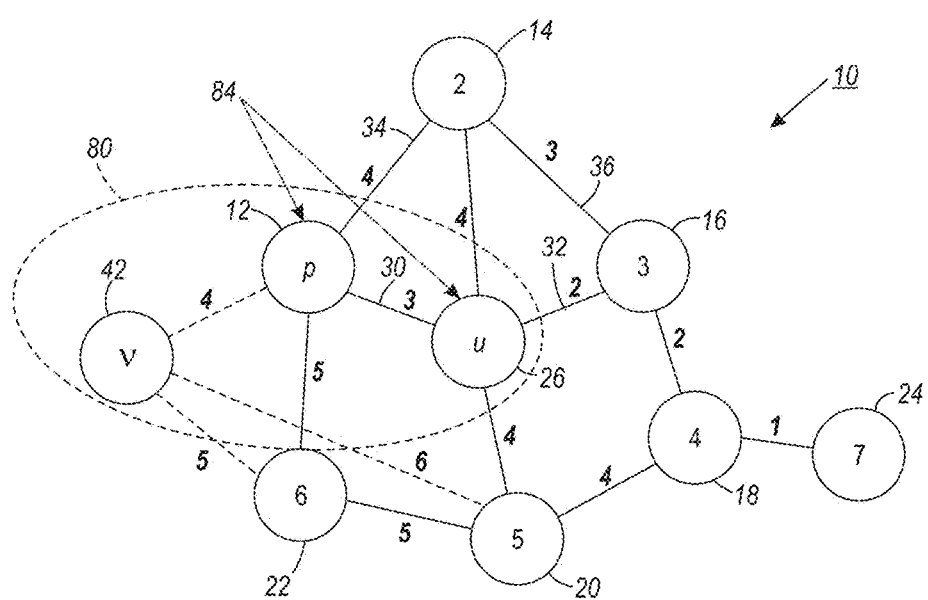
FIG. 4 illustrates the identification of a second neighbor to a subset of nodes that include nodes v and p, in the graph of FIG. 1.

The system 40 uses an iterative approach for selecting nodes for the Minimax K-NN set 44 of dataset objects. The update component 72 identifies, for each unselected node at time T, the minimum pairwise distance to any one of a current subset 80 of objects (nodes) (FIGS. 3 and 4). These minimum pairwise distances may be stored in a distance vector (dist) 82. The subset 80 of objects consists of node v and all nodes which have so far been selected to be in the K-NN set (sometimes referred to as the partial set 84 of neighbors). At the first iteration, the partial set 84 of neighbors is empty. It is assumed that every node in the graph is connected by a single edge to every other node, even if the pairwise distance is extremely large.

The extension component 74 extends the partial set 84 of neighbors, at each iteration, by adding, to the partial neighbors, one of the unselected nodes for which no other node in the unselected set has a lower minimum pairwise distance to the nodes currently in set 80. The iterative process thus sequentially adds a node to set 84. The added node is the one which has the smallest minimum pairwise distance to any node in the current subset 80 of nodes (that includes node v) until K objects 44 have been identified.

The prediction component 76 optionally uses information associated with the K-NN set 44 of nodes to make a prediction for the node v. As an example, a label for node v is predicted, as a function of the labels of the K-NN nodes and optionally their Minimax distances or pairwise distances to v (placing greater weight on nodes which have shorter distances). As another example, node v may be predicted to be an outlier, and is not considered a member of any of the set of potential classes. The output component 78 outputs information 86, such as the K-NN set of objects or information based thereon, such as the label predicted for node v or a prediction that v is an outlier.

The computer 48 may include one or more of a PC, such as a desktop, a laptop, palmtop computer, portable digital assistant (PDA), server computer, cellular telephone, tablet computer, pager, combination thereof, or other computing device capable of executing instructions for performing the exemplary method.

The memory 50 may represent any type of non-transitory computer readable medium such as random access memory (RAM), read only memory (ROM), magnetic disk or tape, optical disk, flash memory, or holographic memory. In one embodiment, the memory 50 comprises a combination of random access memory and read only memory. In some embodiments, the processor 54 and memory 50 may be combined in a single chip. The network interface 56, 58 allows the computer to communicate with other devices via a computer network, such as a local area network (LAN) or wide area network (WAN), or the internet, and may comprise a modulator/demodulator (MODEM) a router, a cable, and and/or Ethernet port. Memory 50 stores instructions for performing the exemplary method as well as the processed data 44, 82, 84, 86.

The digital processor 54 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 2 is a high level functional block diagram of only a portion of the components which are incorporated into a computer system 40. Since the configuration and operation of programmable computers are well known, they will not be described further.

Figure 5:
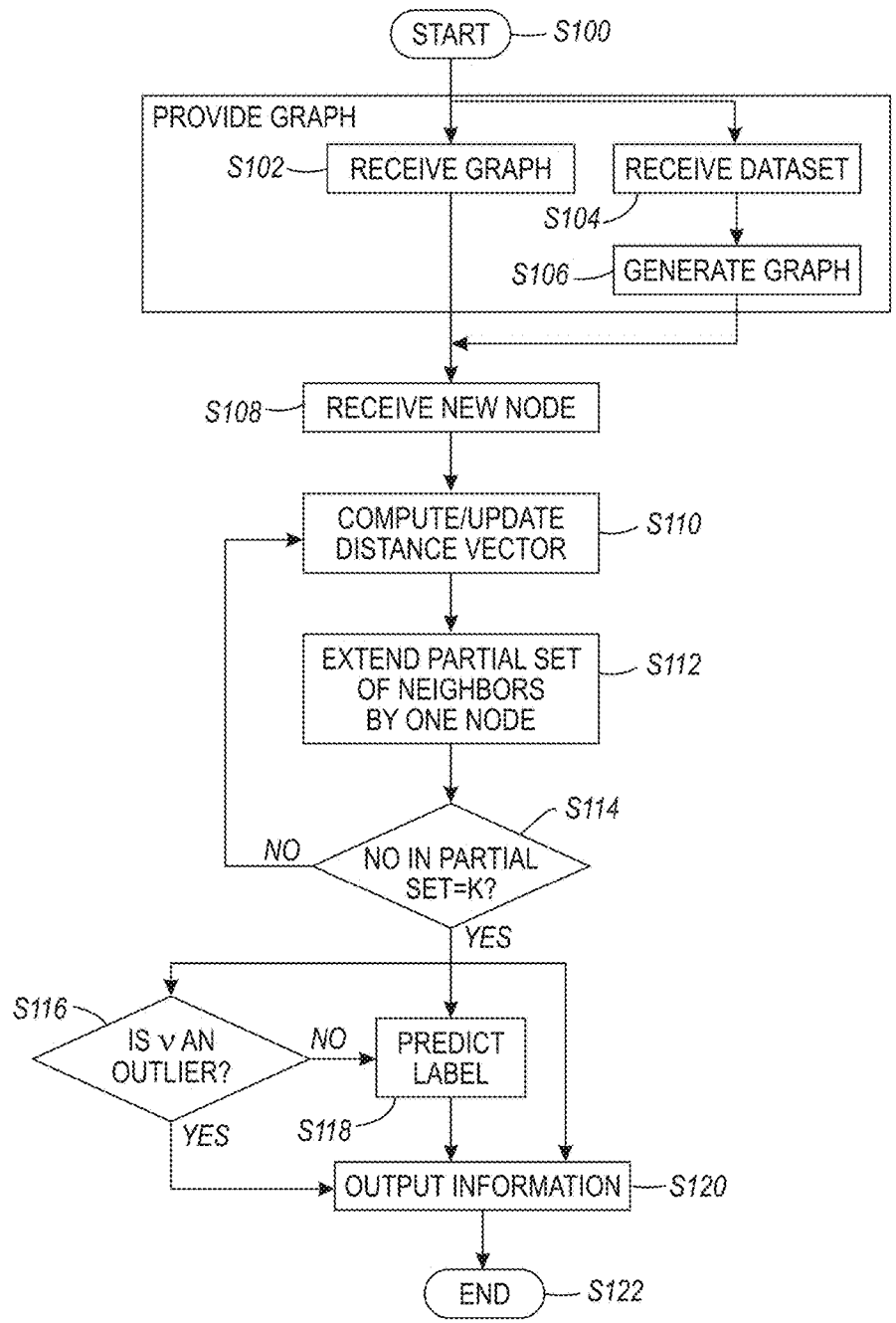
FIG. 5 is a flow chart illustrating a system for identification of a set of nearest neighbors based on the Minimax distance.

FIG. 5 illustrates a method for identifying a set of K nearest neighbors. The method begins at S100.

A graph 10 representing a dataset 79 of objects is provided. In one embodiment, at S102, the graph is received and stored in memory 50. Alternatively, at S104, a dataset 79 of objects is received and at S106, a graph 10 is generated based thereon and stored in memory.

At S108, a new a test object 42 is received and is represented by a node v in the graph 10, by the graphing component 70.

At S110, a distance vector 82 is computed by the update component 72. The distance vector includes, for each unselected node (that is not currently in set 84) a minimum pairwise distance. This is the smallest distance to any one of the nodes currently in set 80. The distance vector may be ranked (sorted) according to minimum distance, such that the next node to be selected is the one with the highest rank.

At S112, the partial set 84 of neighbors is extended by one node, by the extension component 74.

At S114, if the number of nodes in partial set 84 is less than K, the method returns to S110, where the distance vector 82 is updated by the update component 72, based on the current partial set 84 of neighbors. Otherwise, if the number of nodes in partial set 84 is equal to K, the method proceeds to S116 and/or S118.

Optionally, at S116, a prediction is made for node v as to whether v is an outlier. If not, the method may proceed to S118, otherwise to S120. Optionally, at S118, a prediction is made for node v based on the nodes in the set 44 and/or their labels.

At S120, information 86 is output, such as the K-NN set 44 or information based thereon, such as an outlier prediction, and/or the prediction made at S118 for node v.

The method ends at S122.

The method illustrated in FIG. 5 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 5 can be used to implement the method. As will be appreciated, while the steps of the method may all be computer implemented, in some embodiments one or more of the steps may be at least partially performed manually.

As will be appreciated, the steps of the method need not all proceed in the order illustrated and fewer, more, or different steps may be performed.

Minimax K-Nearest Neighbor Classification

Some definitions will now be provided. The method involves a K-nearest neighbor search via Minimax distances on general graphs. Given a graph $\mathcal{G}$ (O,D), such as graph 10, the Minimax (MM) distance $D_{i,j}^{MM}$ between objects i and j is computed as the minimum, over all routes between i and j, of the maximum gap (pairwise distance) along the route, which can be expressed according to Eqn. 1:

$$D_{i,j}^{MM} = \min_{r \in \mathcal{R}_{ij}(o)} \left\{ \max_{1 \le l \le |r|} D_{r(l)r(l+1)} \right\}, \quad (1)$$

where $\mathcal{R}_{ij}(O)$ is the set of all routes r between nodes i and j.

O indicates a set of N dataset objects with a corresponding set of measurements D, where each $D_{ij}$ indicates the pairwise distance between objects i and j.

|r| denotes the number of routes r in the set of possible routes between i and j in the graph.

$D_{r(l)r(l+1)}$ indicates the pairwise distance between a pair of adjacent nodes on a given route.

D does not necessarily render a metric, i.e., the triangle inequality may fail. D should satisfy three basic conditions:

i) zero self loops, i.e., $\forall i, D_{ii}=0$,
ii) non-negativity, i.e., $\forall i,j, D_{ij} \le 0$, and
iii) symmetry, i.e., $\forall i,j, D_{ij}=D_{ji}$.

Given a new object (node) v, the goal is to compute the K objects from the dataset O whose Minimax distances from v are not larger than for any other object in O. It is assumed that there is a function d(v,O) which computes the pairwise distances between v and all the objects in O (such as the (squared) Euclidean distance or cosine-based distance (1-cosine similarity)). Then, by adding v to $\mathcal{G}$, a graph $\mathcal{G}^+(O \cup v, D \cup d(v,O))$ is obtained which includes the set of objects which is the union of the original set and v, and the pairwise distances between all of these objects.

K-Nearest Neighbor Using Minimax Distance

In the exemplary embodiment, an incremental approach is used for computing the Minimax K-nearest neighbors of the new object v, i.e., the $(T+1)^{th}$ Minimax neighbor of v is obtained, given the first T Minimax neighbors.

First, a partial set 84 of neighbors $\mathcal{NP}_T(v)$ of v is defined as the first Minimax neighbors of v over graph $\mathcal{G}^+(O \cup v, D \cup d(v,O))$. This is a subset consisting of T of the objects in the set O wherein there does not exist an object in the set O minus the subset $\mathcal{NP}_T(v)$ for which the Minimax distance between object v and each object j is less than the Minimax distance between object v and each object i which has been added to the subset $\mathcal{NP}_T(v)$, i.e.:

$$\mathcal{NP}_T(v) = \{\{i\} \subseteq O : |\{i\}| = T, \nexists j \in \{O \setminus \mathcal{NP}_T(v)\} : D_{vj}^{MM} < D_{vi}^{MM}\} \quad (2)$$

This partial set $\mathcal{NP}_T(v)$ of objects drawn from O is then extended iteratively until it contains the K nearest neighbors of v according to the Minimax distance measure. Theorem 1 shows a way to extend $\mathcal{NP}_T(v)$ step by step until this is achieved, without the need to compute the Minimax distances directly.

Theorem 1:

Given a graph $\mathcal{G}$ (O,D) and a node v, assume that the first T Minimax neighbors of v (i.e., the set $\mathcal{NP}_T(v)$) have already been computed. Then, the node with the minimal pairwise distance to the set $\{v \cup \mathcal{NP}_T(v)\}$, which combines v with the partial set of nearest neighbors $\mathcal{NP}_T(v)$, is considered the $(T+1)^{th}$ Minimax nearest neighbor of v.

Given a set $S \subset O$, the distance of object $i \in \{O \setminus S\}$ to S is obtained by the minimum of the distances between i and objects in S.

Proof.

Let u denote the new (potential) neighbor. Let $e_{u^*}$ denote the edge (with the smallest pairwise distance) connecting u to $\{v \cup \mathcal{NP}(v)\}$ and let $p \in \{v \cup \mathcal{NP}_T(v)\}$ denote the node at the other side of $e_{u^*}$ which is currently in the set 80 (see, e.g., FIG. 4). Two cases are considered:

$$D_{p,u} \leq D_{v,p}^{MM}, \qquad 1.$$

the weight (pairwise distance) of $e_{u^*}$ is not larger than the Minimax distance between v and p. Then, $D_{v,u}^{MM} = D_{v,p}^{MM}$ and therefore u is naturally a valid choice.

$$D_{p,u} > D_{v,u}^{MM}, \qquad 2.$$

then it can be shown that there exists no other unselected node u' (i.e., from $\{O \setminus \mathcal{NP}_T(v)\}$) which has a smaller Minimax distance to v than u. Thus:

(a) This gives $D_{v,u}^{MM} = D_{p,u}$: Because, on the route from v to p and then to u, $D_{v,u}^{MM}$ (according to the assumption $D_{p,u} > D_{v,p}^{MM}$). Moreover, it can be shown that there is no other route from v to u whose maximum weight is smaller than $D_{p,u}$. This is because, if such a route exists, then there must be a node $p' \in \mathcal{NP}_T(v)$ which has a smaller distance to an external node like u'. This leads to a contradiction since u is the closest neighbor of $\mathcal{NP}_T(v)$.

(b) For any other unselected node u' then $D_{v,u'}^{MM} \leq D_{p,u'}$. This is because computing the Minimax distance between v and u' requires visiting an edge whose node at one side is inside $\mathcal{NP}_T(v)$, while the other side is outside $\mathcal{NP}_T(v)$. Among such edges, $e_{u^*}$ has the minimal weight, therefore, $D_{v,u'}^{MM}$ cannot be smaller than $D_{p,u'}$.

Finally, from (a) and (b) it can be concluded that $D_{v,u}^{MM} \leq D_{v,u'}^{MM}$ for any unselected node u'≠u. Hence, u has the smallest Minimax distance to v among all unselected nodes. End of Proof.

Theorem 1 proposes a dynamic programming approach to compute the Minimax K-nearest neighbors of v. Iteratively, at each step, the next Minimax nearest neighbor is obtained by selecting the external node u which has the minimum distance to any of the nodes in $\{v \cup \mathcal{NP}_T(v)\}$. This procedure is repeated K−1 more times.

Algorithm 1 describes the exemplary method in accordance with one embodiment. Since the algorithm is performed based on finding the nearest unselected node, the vector dist 82 is used to store the minimum pairwise distance of each of the unselected nodes to (one of the members of) the set 80 denoted $\{v \cup \mathcal{NP}_T(v)\}$. In this way, the algorithm finds a new neighbor in two steps: i) extension: picks the minimum of dist and adds the respective node to $\mathcal{NP}_T(v)$, and ii) update: updates dist by checking if an unselected node has a smaller pairwise distance to the new $\mathcal{NP}_T(v)$. Thus dist is updated by dist=min(dist,$D_{min\_ind,i}$), except for the members of $\mathcal{NP}_T(v)$. To avoid the new member being selected again, its entry in dist is set to infinity (step 8 in Algorithm 1).

---

Algorithm 1: Calculation of Minimax K-nearest neighbor

---

Require: Graph $\mathcal{G}^+$ (O ∪ v, D ∪ d(v, O)) including a test object v.
Ensure: A list of K Minimax nearest neighbors of v stored in $\mathcal{NP}(v)$.
 1: Initialize vector dist by the distance of v to each object in O.
 2: $\mathcal{NP}(v) = [\,]$
 3: for T = 1 to K do
 4:    {extension}
 5:    min_ind = argmin(dist)
 6:    $\mathcal{NP}(v)$.append(min_ind)
 7:    {update}
 8:    dist$_{min\_ind}$ = inf
 9:    for i ∉ $\mathcal{NP}(v)$ do
10:       if $D_{min\_ind,i}$ < dist$_i$ then

---

Algorithm 1: Calculation of Minimax K-nearest neighbor

---

11:          dist$_i$ = $D_{min\_ind,i}$
12:       end if
13:    end for
14: end for
15: return $\mathcal{NP}(v)$

---

The algorithm starts with a graph $\mathcal{G}^+$ which includes the test object v and the objects initially in graph $\mathcal{G}$, the pairwise distances D between each of the objects in graph $\mathcal{G}$ as well as the pairwise distance d between each object in $\mathcal{G}$ and test object v. The measurements D may be initially stored as a matrix.

Step 1 corresponds to S110 (first iteration), with a distance vector being generated which stores the pairwise distance between each object in the graph $\mathcal{G}$ and test node v.

At step 2, the set $\mathcal{NP}(v)$ at time T=0 is initialized with an empty set.

At step 3, for each time T from 1 to K, the following steps are performed to add a new node to the set $\mathcal{NP}(v)$ and then update the dist vector.

At step 4, the set of partial neighbors $\mathcal{NP}_T(v)$ is extended by one object, as described above (S112). In particular, at step 5, the node with the minimum distance is identified from the dist vector. Then at step 6, this new node is appended to the set $\mathcal{NP}(v)$.

At step 7, the distance vector is updated. In particular, at step 8, the distance to the newly-selected object is set to infinity (so that it will not be selected again). Then at step 9, for each object which is not currently in the set of partial neighbors $\mathcal{NP}_T(v)$, the following step is performed: at steps 10 and 11, the distance from node i is set as the minimum of: a) its prior pairwise distance to the set of partial neighbors $\mathcal{NP}_T(v)$ and b) its pairwise distance to the newly added node.

At step 12, the loop starting at step 10 ends.
At step 13, the loop starting at step 9 ends.
At step 14, the loop starting at step 3 ends.
At step 15, the set of nearest neighbors is output (S118).

An example implementation of the algorithm is illustrated in FIGS. 3 and 4. In FIG. 3, the distance from node v to each of nodes 12, 20, and 22 is shown (assume that the pairwise distance from v to all other nodes in the graph is much larger). At the first iteration, the set 80 includes only node v. The node with the shortest pairwise distance to this set is therefore node 12 (with a pairwise distance of 3), which is added to the set 80. At the next iteration, the unselected node with the shortest pairwise distance to set 80 is node 26, with a pairwise distance of 3 along edge 30 (FIG. 4). The next node to be added would be node 16, and so forth until K nodes have been added. If there are two (or more) nodes which are the same distance to the set 80 at a given iteration, then the method may select one at random.

Representation of Objects

For text documents, vectorial representations can be obtained based on the words of the document, after eliminating stop words. As an example, a bag of words or a term frequency-inverse document frequency (tf-idf) representation can be used.

For images, a representation based on the pixels of the image can be used. As an example, patches are extracted from the image at multiple scales, such as at least 50 patches. Each patch is described with a descriptor, which is based on features of the pixels, such as color and/or gradient (e.g., SIFT) features. The patch descriptors are then embedded in a higher dimensional space using an embedding function. In one embodiment the embedding function may be the explicit embedding of the Fisher kernel, termed a Fisher vector (FV). Briefly, the FV involves computing the gradient of the log-likelihood of a patch descriptor with respect to the parameters of an underlying generative model, such as a Gaussian Mixture Model (GMM). The Gaussian mixture model includes a set of Gaussian functions, from which all the local descriptors are presumed to be emitted. Each Gaussian function can be represented by a set of parameters which include the mean vector and covariance matrix. Each patch descriptor can thus be characterized by a vector of weights, one for each considered parameter of each Gaussian function. For example, there may be at least 16, or at least 32, or at least 64, or at least 128, or at least 512 Gaussians in the GMM. It can be assumed that the covariance matrices are diagonal. See, for example, Sánchez, et al., "Image classification with the Fisher vector: Theory and practice," IJCV, 105(3):222-245 (2013); Perronnin, et al., "Improving the fisher kernel for large-scale image classification," Proc. 11$^{th}$ European Conference on Computer Vision (ECCV): Part IV, pp. 143-156 (2010); Sánchez, et al., "High-dimensional signature compression for large-scale image classification," in CVPR 2011; Perronnin, et al., "Fisher kernels on visual vocabularies for image categorization" in CVPR (2007); and U.S. Pub. Nos. 20120076401 and 20120045134, the disclosures of which are incorporated herein by reference in their entireties. As an alternative to the Fisher Vector, other embedding functions may be used, such as a bag-of-visual-words.

Pairwise Distances

Cosine similarity has been found to be a good choice for textual data. Thus, for each pair of document vectors $x_i$ and $x_j$, their cosine similarity is computed and then their pairwise distance is determined by $1-\text{cosine }(x_i,x_j)$ to construct the pairwise distance matrix D. For non-textual datasets, the pairwise squared Euclidean distances can be computed directly.

The method can be used for classification, e.g., ν can be given a labels or a label distribution based on the labels of its nearest neighbors. One advantage of using K-nearest neighbors for classification over other classification methods is that it does not require a training phase in advance. This is particularly advantageous when dealing, for example, with stream data where the classes are changing over time and a trained model is no longer useful for future prediction. This is the case where the training and the test objects are changing with the same rate, such that the training on the past data is not applicable for predicting the current test objects.

Moreover, K-nearest neighbor search can be also used for robust non-parametric density estimation in an unsupervised manner, i.e., beyond classical supervised setting.

Computational Complexity of Algorithm 1

In theory, each step of Algorithm 1, either the extension or the update, requires an O(N) running time. Therefore the total complexity is O(N) which is the same as for the standard K-nearest neighbor method. However, the standard K-nearest neighbor algorithm computes only step 1. Algorithm 1 only adds a second update step and is therefore more efficient than the message passing method of Kim 2007, which requires more visits of the objects and also a minimum spanning tree constructed in advance on $\mathcal{G}$ (O,D).

Comparison Between Minimax K-Nearest Neighbor Search and the Prim's Algorithm

Since the method in Kim 2007 requires computing a complete MST, the connection between Algorithm 1 and minimum spanning trees can be evaluated.

Theorem 2 shows that computing the Minimax distances over a graph is equivalent to computing a minimum spanning tree (MST) and then obtaining Minimax distances over that. The proof is similar to the maximum capacity problem (Hu, "The maximum capacity route problem," Operations Research, 9:898-900, 1961).

Theorem 2.

For every pair of objects i, j∈O in graph $\mathcal{G}$ (O,D), their Minimax distance over $\mathcal{G}$, i.e., $D_{i,j}^{MM}$ is identical to their Minimax distance over 'any' minimum spanning tree constructed on $\mathcal{G}$.

This result does not depend on the particular choice of minimum spanning tree construction algorithm. As an example, a generic method for constructing minimum spanning trees called the Generalized Greedy Algorithm can be used (Gabow, et al., "Efficient algorithms for finding minimum spanning trees in undirected and directed graphs," Combinatorica, 6(2):109-122, 1986, hereinafter, "Gabow 1986"). Consider a forest (collection) of trees $\{T_p\}$. The distance between the two trees $T_p$ and $T_q$ is obtained by:

$$\Delta T_{pq} = \min_{i \in T_p} \min_{j \in T_q} D_{ij}. \quad (3)$$

$\Delta T_{pq}$ is symmetric, i.e., $\Delta T_{pq} = \Delta T_{qp}$. The nearest neighbor tree of $T_p$, i.e., $T^*_p$, is obtained by:

$$\Delta T^*_p = \underset{T_q}{\arg\min} \Delta T_{pq}, \quad (4)$$

$q \neq p$.

Then, the edge $e^*_p$ represents the nearest tree from $T_p$. It can be shown that $e^*_p$ will be part of a minimum spanning tree as otherwise it yields a contradiction (Lemma 2) (Gabow 1986).

Lemma 1 Given graph $\mathcal{G}$ (O,D) and a forest of non-empty and disjoint trees $\{T_p\}$, assume it is already known that all the trees are included in a minimum spanning tree to be constructed on the graph. Then, the edge $e^*_p$ will be part of the complete minimum spanning tree.

Lemma 1 provides a generic way to compute a minimum spanning tree. Consider a set of singleton trees: $T_1, T_2, \ldots, T_N$, where $T_i$ contains only the i-th object (node). A greedy MST algorithm at each step, i) picks two candidate (base) trees where one is the nearest neighbor of the other, and ii) combines them via their shortest distance (edge) to build a larger tree. The procedure continues until a complete tree is built or there is no further inter-tree edge. Several algorithms differ only in the way they pick the candidate trees at each step, e.g., the Kruskal algorithm (Kruskal, "On the Shortest Spanning Subtree of a Graph and the Traveling Salesman Problem," Proc. Am. Mathematical Soc., 7, pp. 48-50, 1956) and the Prim algorithm. For example, the Kruskal algorithm, at each step, picks the pair of candidate trees that have the minimal distance. The Prim algorithm produces the MST via growing only one tree, say $T_1$, by attaching a singleton unselected tree at each step to that, until it contains all the nodes.

Lemma 1 guarantees that Algorithm 1 yields a minimum spanning subtree on $\{v \cup \mathcal{NP}_T(v)\}$, i.e., a tree which is a subset of a larger minimum spanning tree on the whole graph $\mathcal{G}^+(O \cup v, D \cup d(v,O))$. In the context of the Generalized Greedy Algorithm, Algorithm 1 generates the MST via growing only the tree started from v and the other candidate trees are singleton nodes.

A complete minimum spanning tree would be constructed, if the attachment continues for N steps, instead of K. This procedure, then, would yield a Prim minimum spanning tree. This analysis shows that the Prim Algorithm is able to sorts the nodes based on their Minimax distances from the origin (test) node v. This analysis also shows the computational optimality of Algorithm 1 compared to the alternative methods. With MST construction, the algorithm always expands the tree which contains the origin node v, whereas the alternative methods may sometimes grow trees that do not have any impact on the Minimax K-nearest neighbors of v. In particular, an advantage of Algorithm 1, over the method in Kim 2007, is that the exemplary method builds a partial MST with only K edges whereas Kim 2007 requires constructing a complete MST in advance.

Appropriate data representation plays a significant role in data processing and analytics. Examples where the system and method may find application include social media analysis, image segmentation, tweet categorization, community detection, knowledge management and network/traffic analysis. The Minimax distance measure enables capturing the arbitrary shape of the underlying structure of the data, without requiring fixing any crucial assumptions in advance. The exemplary algorithm is particularly applicable to social media analytics, where there may be millions of tweets or blogs which can be categorized efficiently and precisely with the present method. The method can also be used for profile enrichment and completion by finding the nearest neighbors of a target profile.

Analysis of One-to-All Minimax Distances

As noted above, Algorithm 1 yields a partial minimum spanning tree consistent with Prim's algorithm. On the other hand, as noted in copending U.S. application Ser. No. 14/616,032, computing all-pair Minimax distances over a (fixed) graph is equivalent to computing a minimum spanning tree and then obtaining Minimax distances over that. Therefore, for computing all-pair Minimax distances $D_{i,j}^{MM}$, the edges which are present in a MST over the graph are considered. In the following, this requirement for the one-to-all case is considered, i.e., the case where the source (origin) is given and fixed (e.g., v), and the goal is to compute the Minimax distances from this source to all other objects (nodes) or to find the K nearest nodes to v with respect to Minimax distance.

Computing all-pair Minimax distances over a (fixed) graph is equivalent to computing a minimum spanning tree and then obtaining Minimax distances over that. This equivalence, stated in Theorem 3, provides an efficient way to compute all-pair Minimax distances. The proof is similar to the Maximum Capacity problem. See, T. C. Hu, "The maximum capacity route problem," Operations Research, 9:898-900, 1961.

Theorem 3 For every pair of objects i,j∈O their Minimax distance over $\mathcal{G}(O,D)$, i.e., $D_{i,j}^{MM}$ is identical to their Minimax distance over 'any' minimum spanning tree constructed on $\mathcal{G}$.

Therefore, for computing all-pair Minimax distances $D^{MM}$, the edges which are present in a MST over the graph are considered. This result does not depend on the particular choice of minimum spanning tree construction algorithm. In this section, we analyze this requirement for one-to-all case, i.e., the case where the source (origin) is given and fixed (e.g. v), and the goal is to compute the Minimax distances from this source to all other objects (nodes) or to find the K nearest nodes to v with respect to Minimax distance.

A straightforward generalization/interpretation of Algorithm 1 gives sorted one-to-all Minimax distances from the origin v to all the other nodes. Only the steps (extension and update) need to be run for N times instead of K. As discussed earlier, this algorithm constructs a (partial) minimum spanning tree on the graph $\mathcal{G}^+$. Unlike the 'all-pair' variant, it is not necessary to build a minimum spanning tree to compute the 'one-to-all' Minimax distances.

To show this, consider the proof of Theorem 1. The proof investigates two cases: i) $D_{p,u} \leq D_{v,p}^{MM}$, ii) $D_{p,u} > D_{v,p}^{MM}$. The first case is now considered in more detail. Consider the largest Minimax distance selected up to step T, i.e., the edge with maximal weight whose both sides occur inside $\{v \cup \mathcal{NP}_T(v)\}$ and its weight represents a Minimax distance. This edge is denoted $e_T^{max}$. Among different external neighbors of $\{v \cup \mathcal{NP}_T(v)\}$, any node $u' \in \{O \setminus \mathcal{NP}_T(v)\}$ whose minimal distance to $\{v \cup \mathcal{NP}_T(v)\}$ does not exceed the weight of $e_T^{max}$ can be selected, even if it does not belong to a minimum spanning tree over $\mathcal{G}^+$ since the Minimax distance will be the weight of $e_T^{max}$. In general, any node $u' \in \{O \setminus \mathcal{NP}_T(v)\}$, whose Minimax distance to a selected member p, i.e., $D_{p,u'}^{MM}$, is not larger than the weight of $e_T^{max}$, can be selected as the next nearest neighbor. This can be concluded from the ultra-metric property of Minimax distances, i.e., $D_{v,u}^{MM} \leq \max(D_{v,u}^{MM}, D_{p,u}^{MM})$, as shown by Lemma 4, below. In this setting:

$$D_{v,u}^{MM} \leq \max(D_{v,p}^{MM}, D_{p,u}^{MM}), \text{ and} \qquad 1.$$

$$D_{v,u}^{MM} > D_{p,u}^{MM}. \qquad 2.$$

Thus, $D_{v,u}^{MM} \geq \max(D_{v,p}^{MM})$, i.e., $$D_{v,u}^{MM} = D_{v,p}^{MM}. \qquad (5)$$

It may be noted that in the second case, i.e., when $D_{p,u} > D_{v,p}^{MM}$, an unselected node is added whose Minimax to v (to one of the nodes in $\mathcal{NP}_T(v)$) is equal to $D_{p,u}$. This situation may also yield adding an edge which does not necessarily belong to a MST over $\mathcal{G}^+$. The argument is similar to the case where $D_{p,u} \leq D_{v,p}^{MM}$.

Figure 6:
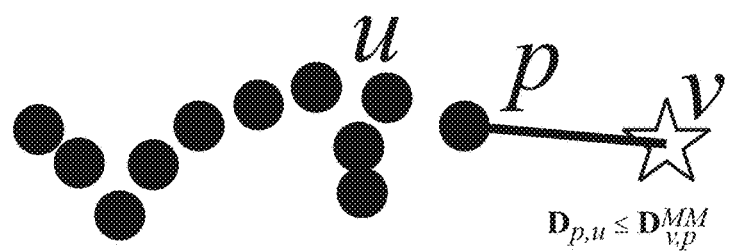
FIGS. 6 and 7 illustrate datasets representing two cases ($[D_{p,u} \leq D_{v,p}^{MM}]$ and $[D_{p,u} > D_{v,p}^{MM}]$) which illustrate that computing Minimax nearest neighbors does not necessarily need to agree with a complete MST on $\mathcal{G}^+$, as any remaining node (any edge) can be replaced with u.
Figure 7:
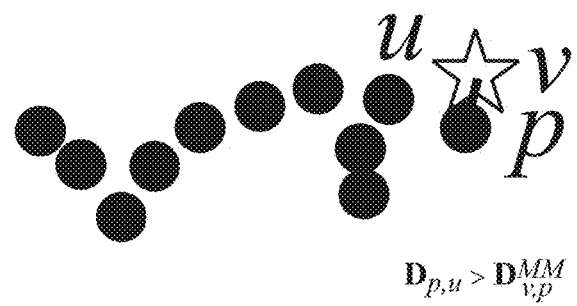

An example of the first case is shown in FIGS. 6 and 7, where K is fixed at 2. After computing the first nearest neighbor (i.e., p) to node v, the next one can be any of the remaining objects, as their Minimax distance to v is the weight of the edge connecting p to v (FIG. 6) or p to u (FIG. 7). Therefore, a node can be chosen such that the partial MST on $\{v \cup \mathcal{NP}(v)\}$ is not a subset of any complete MST on the whole graph. Therefore, computing one-to-all Minimax distances is different from all-pair Minimax distances: Unlike the 'all-pair' variant, the 'one-to-all' variant may not necessarily require taking into account the construction of a minimum spanning tree. Therefore, such an analysis suggests an even more generic algorithm for computing one-to-all Minimax distances (including Minimax K-nearest neighbor search) which does not necessarily yield a minimum spanning tree on the whole graph. To expand $\mathcal{NP}_T(v)$, a new u' is added whose Minimax distance to $\{v \cup \mathcal{NP}_T(v)\}$ is minimal. Algorithm 1 is only one way, but an efficient way, to sort one-to-all Minimax distances and compute the K nearest neighbors.

Minimax Distances and Outlier Detection

In some applications, the data may come from different sources. In a classification example, the test object(s) 42 may not necessarily comply with the structure of the dataset objects 79, e.g., a test object 42 may be an outlier or belong to other classes than those of the dataset objects. In a more general setting, in some situations, a new dataset of test objects may contain a different structure than the already existing labeled data. It is therefore desirable to provide efficient methods to perform a kind of Domain Adaptation. In particular, it is useful to determine how the new dataset of test objects is related to the existing one.

More specifically, when computing the K nearest neighbors of v, v may be an outlier or irrelevant with respect to the underlying structure in O. This case is now studied in more detail and an efficient algorithm (Algorithm 2) is disclosed which, while computing Minimax K nearest neighbors, also predicts whether v is an outlier. This algorithm adapts Algorithm 1 to outlier detection.

One special case of Algorithm 1 occurs where as $\mathcal{NP}_T(v)$ is extended, the edge representing the Minimax distance between v and the new member u (i.e., the edge with the largest weight on the route indicating the Minimax distance between v and u) is always connected to v. When u is being added to $\mathcal{NP}_T(v)$, two special cases may occur:
1. u is directly connected to v, i.e., p=v.
2. u is not directly connected to v (i.e. p≠v), but its Minimax distance to v is not represented by $D_{p,u}$, i.e. $D_{p,u} < D_{v,p}^{MM}$.

Figure 8:
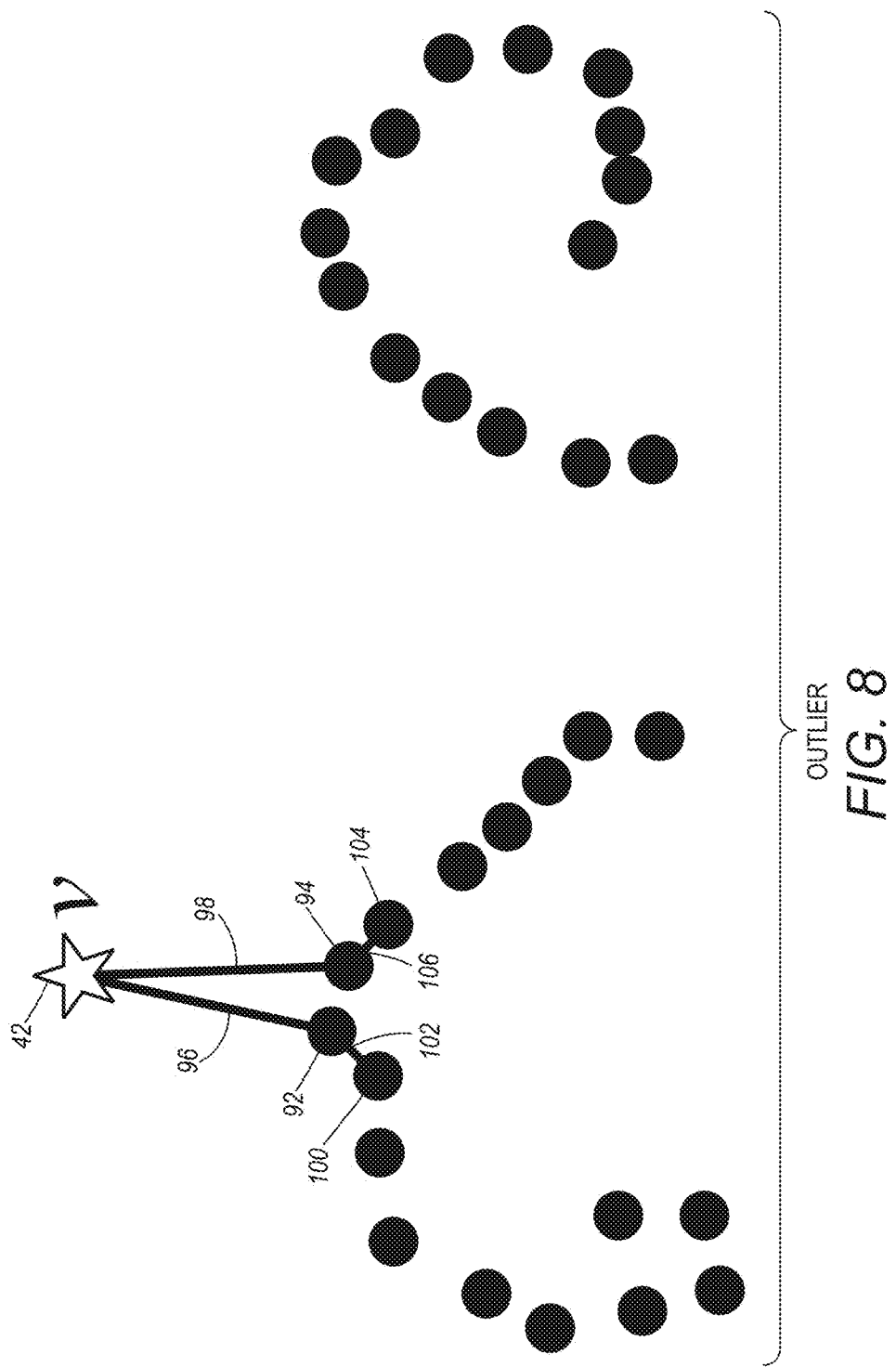
FIGS. 8-10 illustrate datasets representing three cases, where v is an outlier (FIG. 8) and when it is not (FIGS. 9 and 10).
Figure 9:
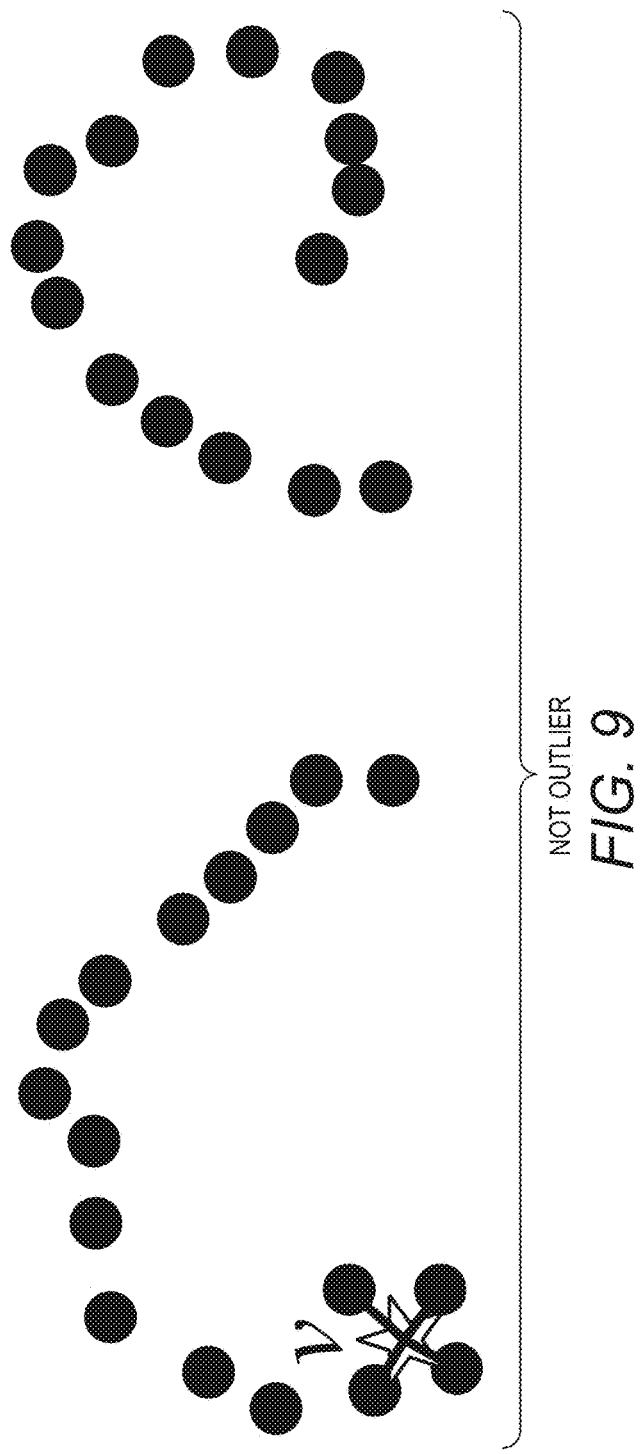
Figure 10:
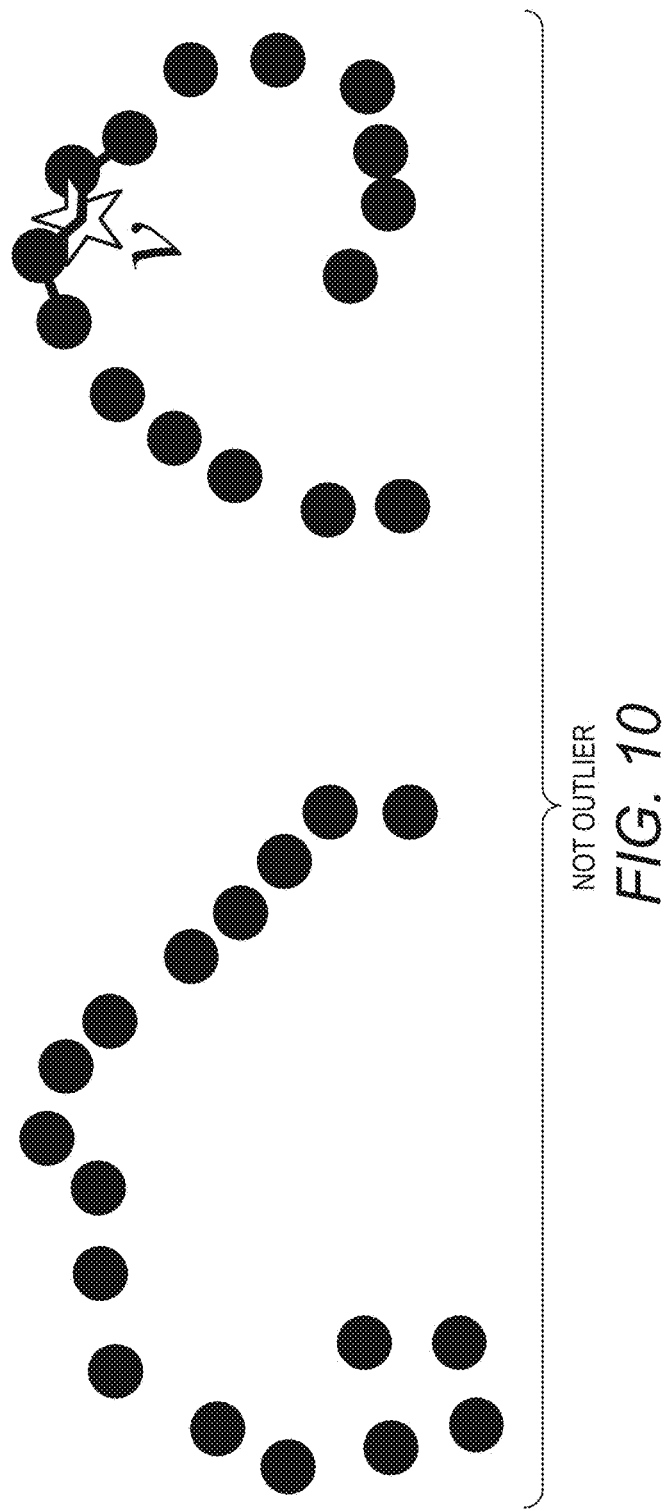
Figure 11:
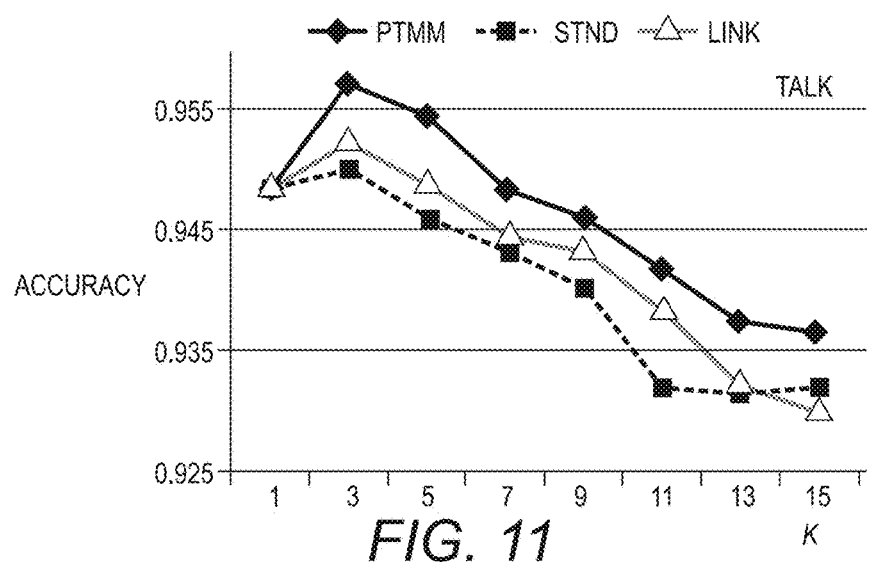
FIG. 11 illustrates accuracy for the TALK dataset and FIG. 12 illustrates runtime for the TALK dataset for different nearest neighbor computation methods.
Figure 12:
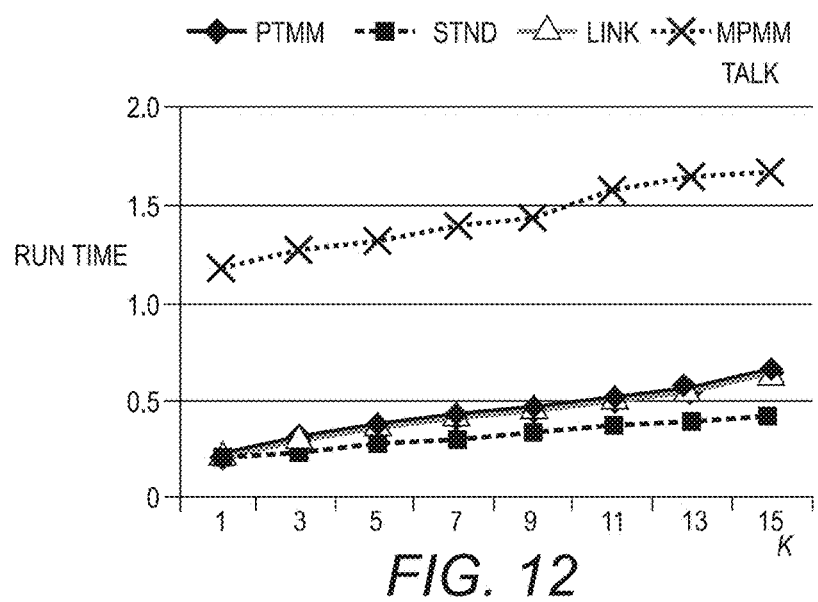
Figure 13:
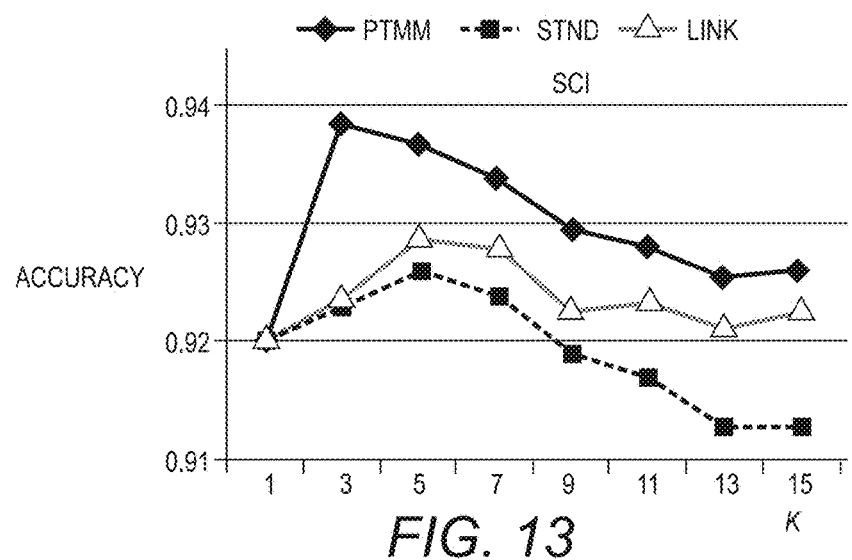
FIG. 13 illustrates accuracy for the SCI dataset and FIG. 14 illustrates runtime for the SCI dataset for the different nearest neighbor computation methods.
Figure 14:
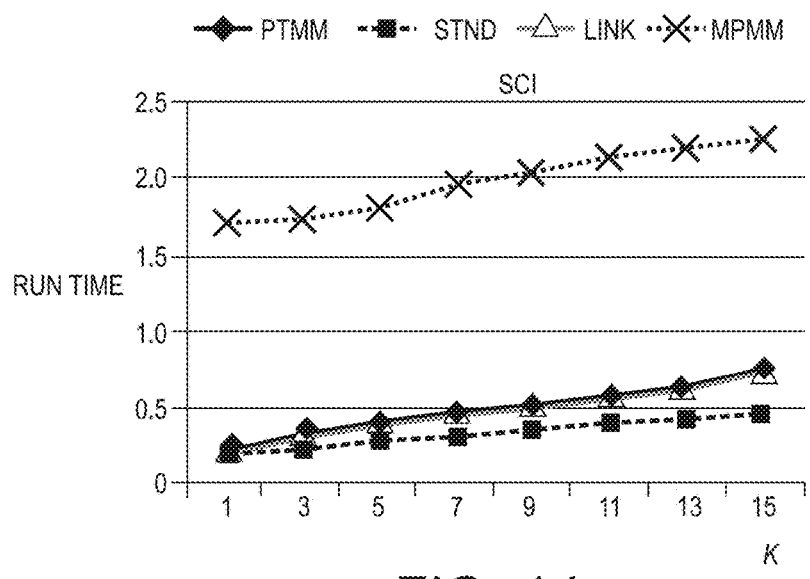
Figure 15:
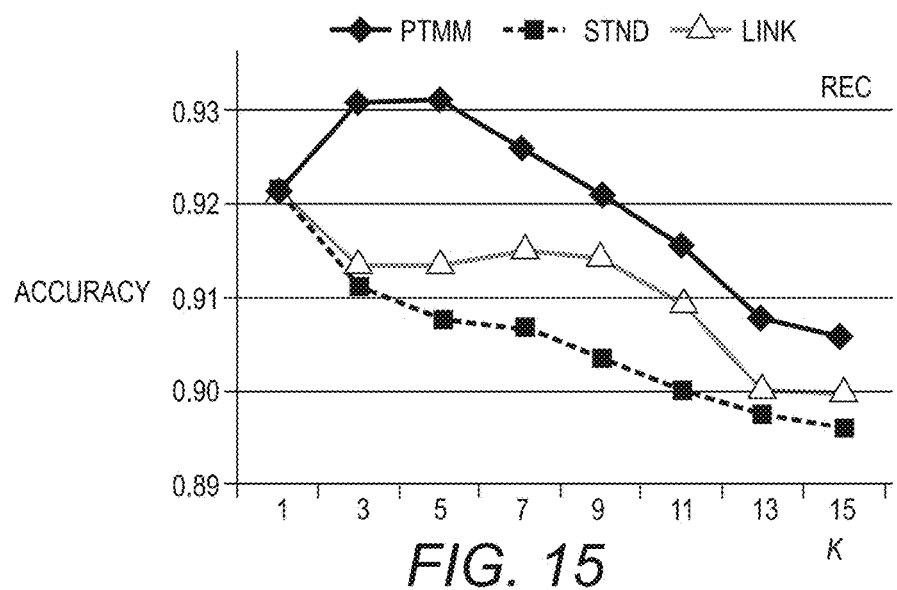
FIG. 15 illustrates accuracy for the REC dataset and FIG. 16 illustrates runtime for the REC dataset for the different nearest neighbor computation methods.
Figure 16:
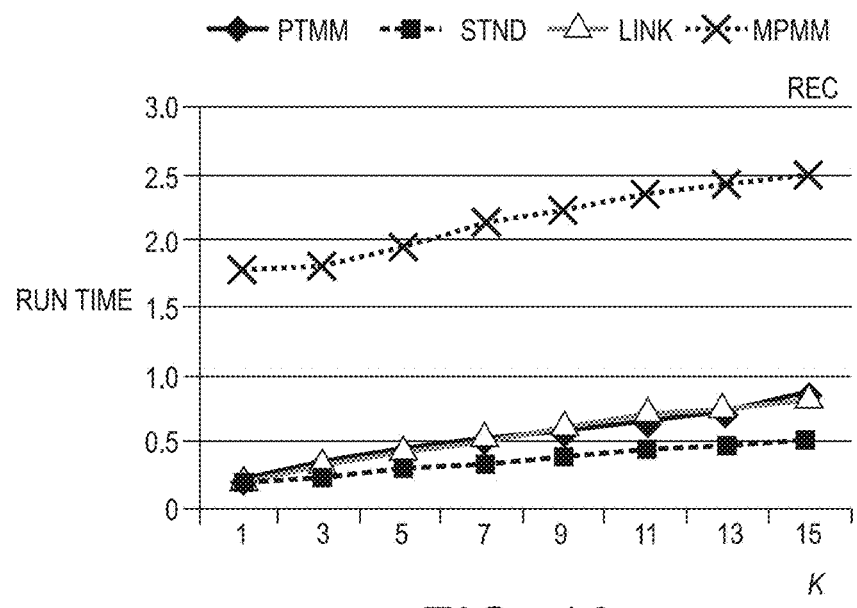
Figure 17:
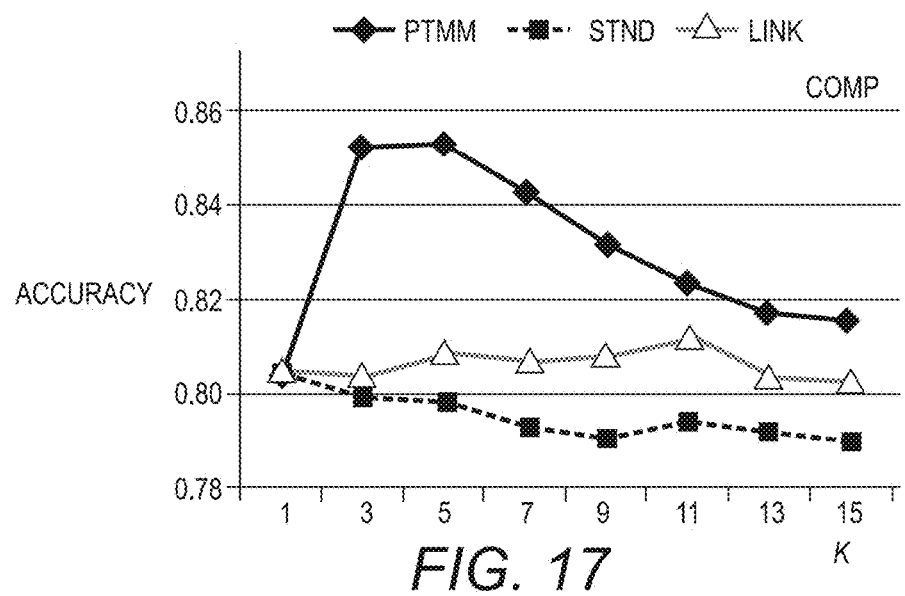
FIG. 17 illustrates accuracy for the COMP dataset and FIG. 18 illustrates runtime for the COMP dataset for the different nearest neighbor computation methods.
Figure 18:
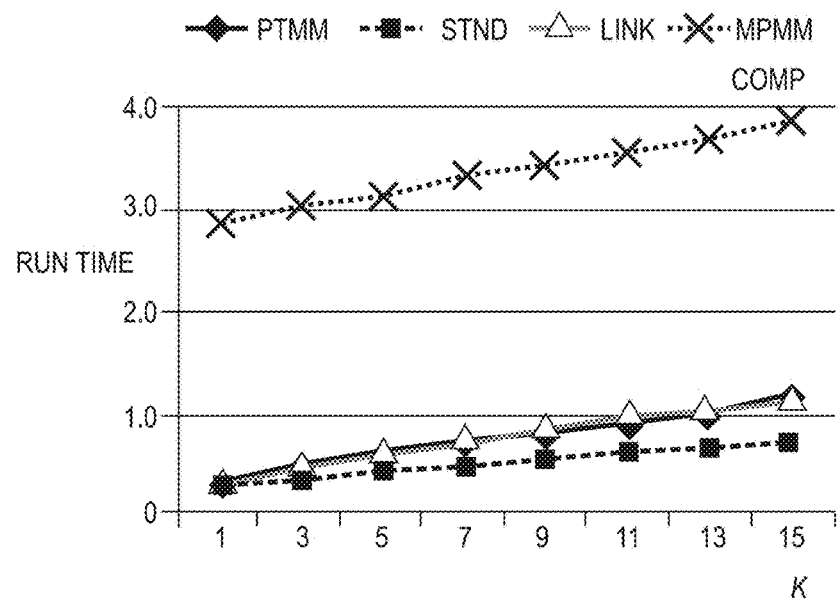
Figure 19:
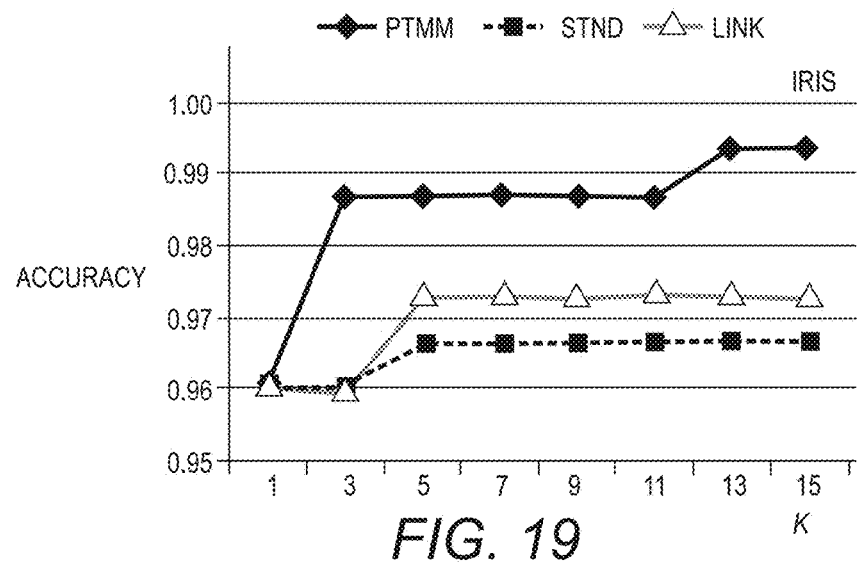
FIG. 19 illustrates accuracy for the IRIS dataset and FIG. 20 illustrates runtime for the IRIS dataset for the different nearest neighbor computation methods.
Figure 20:
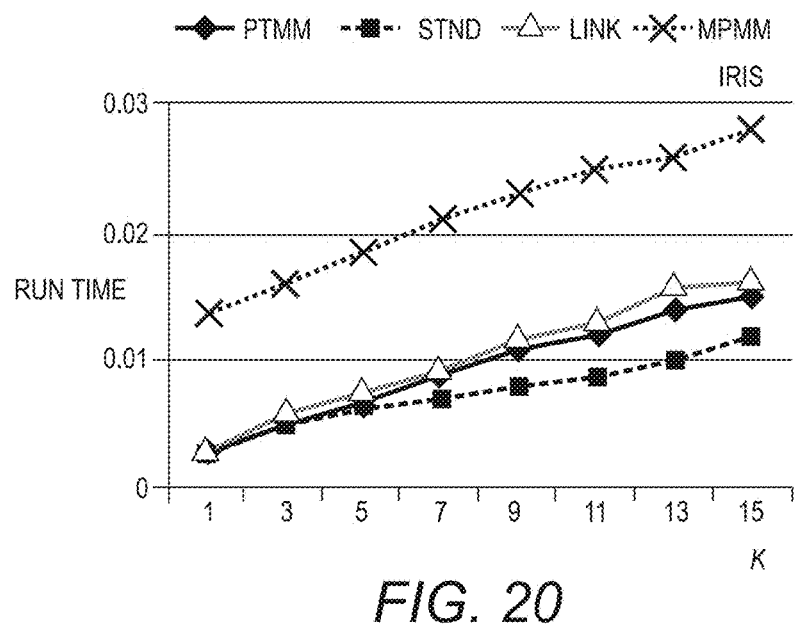
Figure 21:
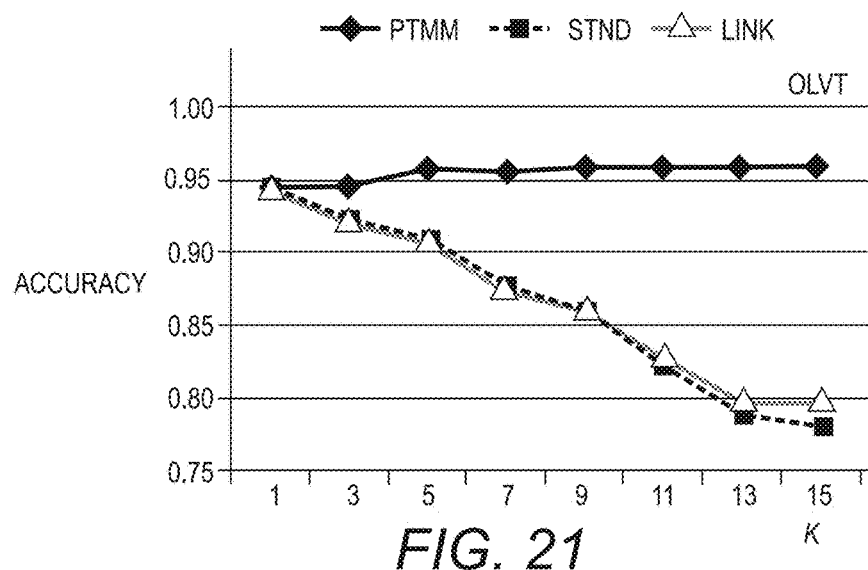
FIG. 21 illustrates accuracy for the OVTL dataset and FIG. 22 illustrates runtime for the OVTL dataset for the different nearest neighbor computation methods.
Figure 22:
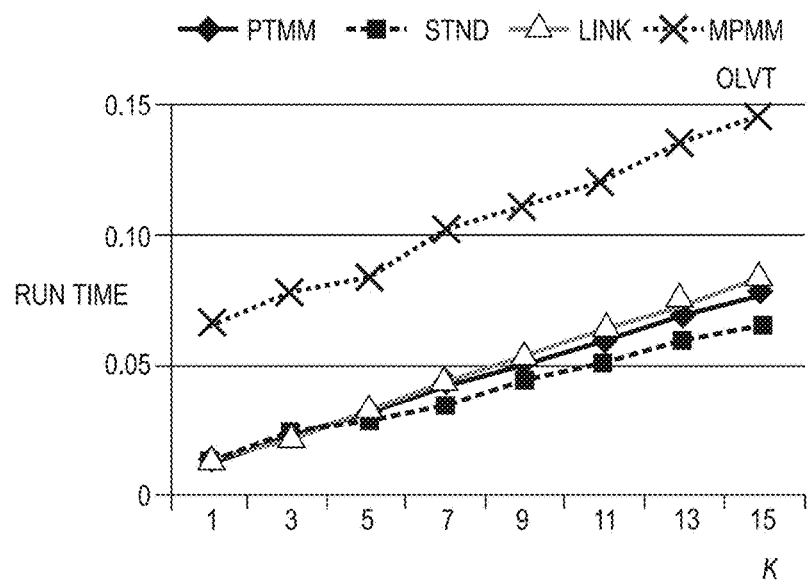
Figure 23:
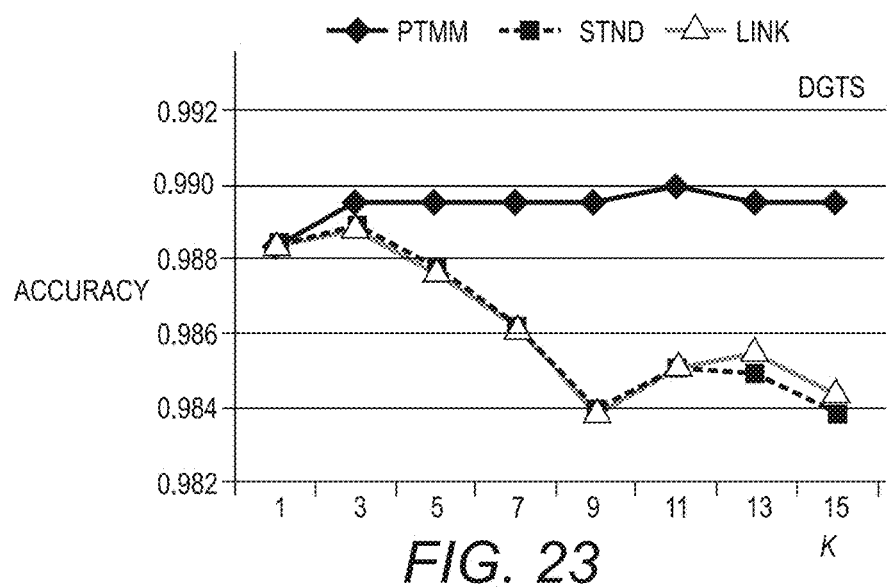
FIG. 23 illustrates accuracy for the DGTS dataset and FIG. 24 illustrates runtime for the DGTS dataset for the different nearest neighbor computation methods.
Figure 24:
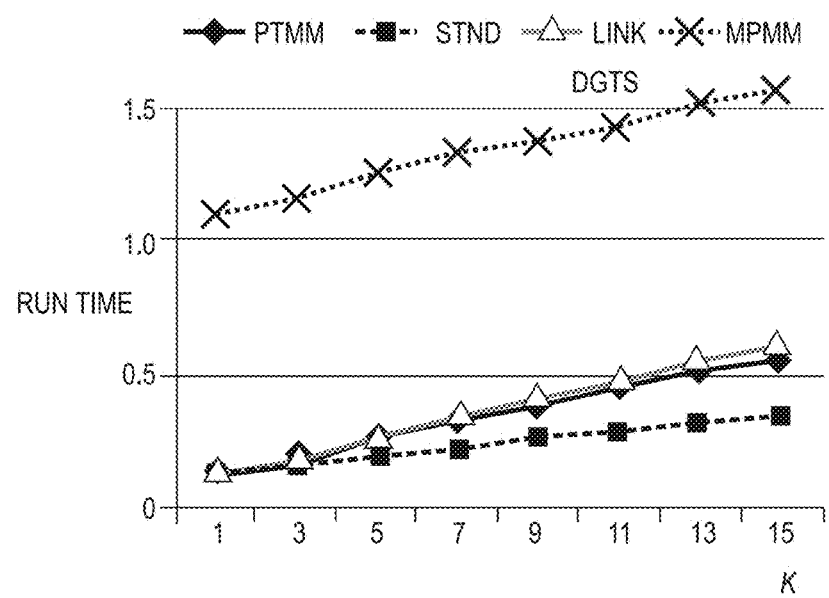
Figure 25:
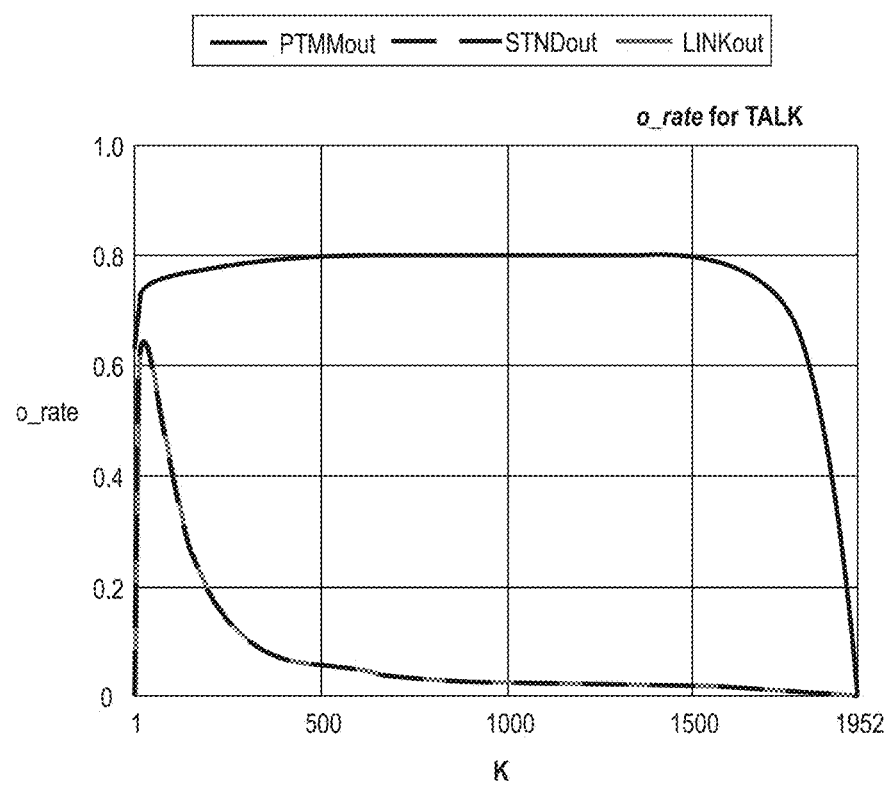
FIGS. 25-28 illustrate o_rate results at different values of K, for the TALK, SCI, REC, and COMP text datasets, respectively, when different methods are used to predict whether the members of train and outlier datasets are an outlier or not.
Figure 26:
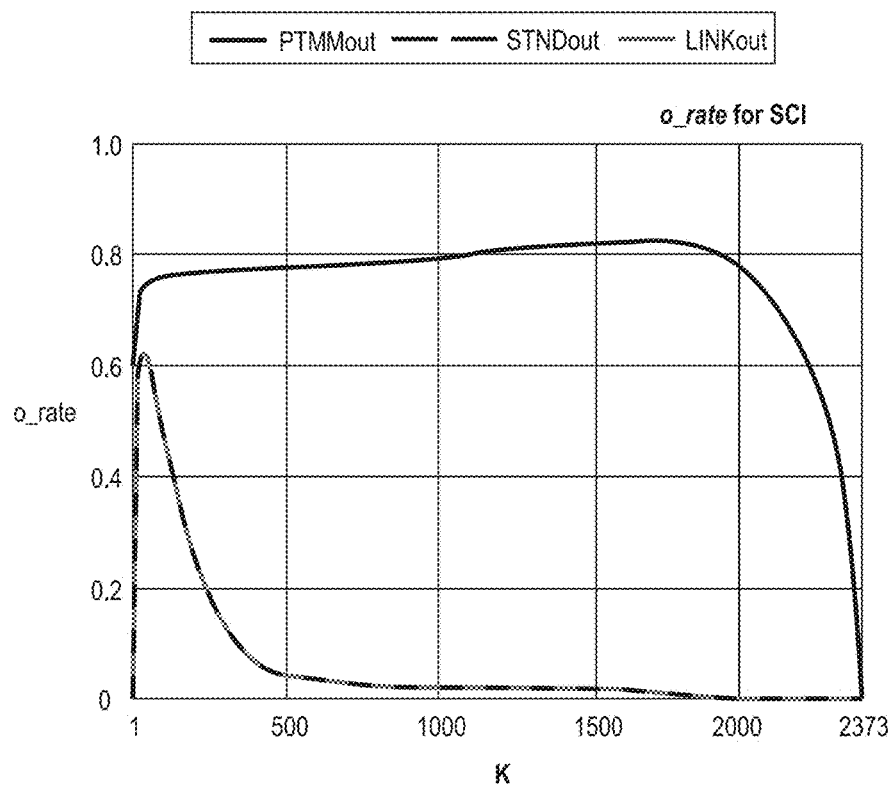
Figure 27:
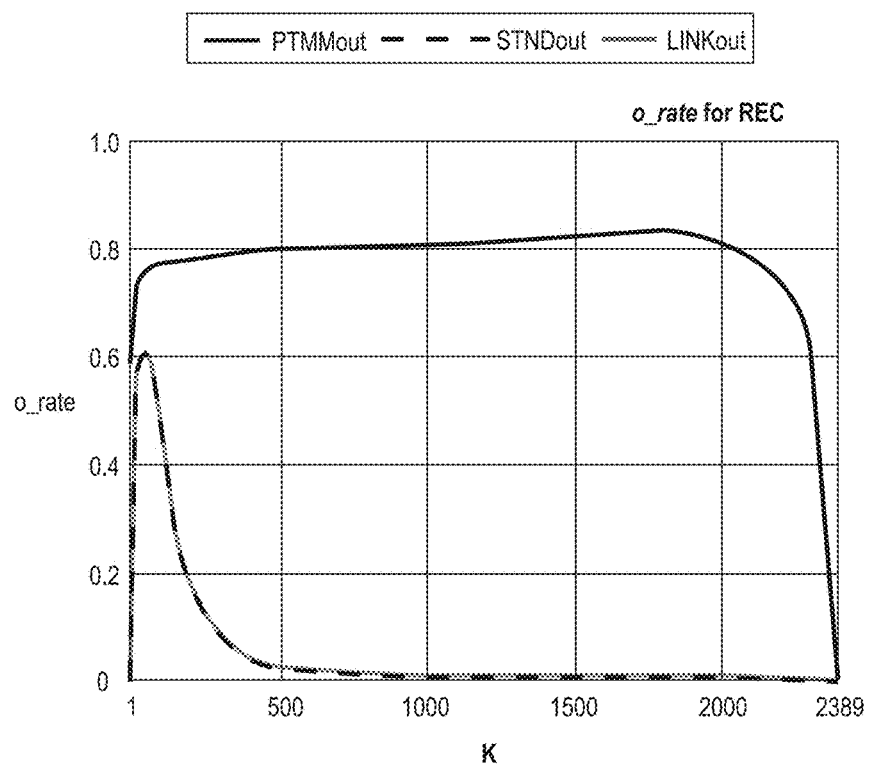

FIGS. 8-10 illustrate various situations, where K is fixed at 4. The edges representing the Minimax distances can provide useful information for detecting if an object is an outlier. In the case of FIG. 8, among the nearest neighbors, two are directly connected to v (i.e., p=v), and two are connected to v via the early members of $\mathcal{NP}_T(v)$, but the Minimax distance is still represented by the edges connected to v. In other words, there is no edge in graph $\mathcal{NP}(O,D)$ which represents the Minimax distance, although some edges of $\mathcal{G}(O,D)$ are involved in Minimax routes. Thus, the type of connection between v and its neighbors is different from the type of the distances inside graph $\mathcal{G}(O,D)$ (without test object v). Therefore, in this case v may be reported as an outlier.

Both of the above mentioned conditions should occur for an outlier determination, i.e., if always p=v (as shown in FIG. 9, where the nearest neighbors are always connected to v), then v might not be labeled as outlier. On the other hand, as shown in FIG. 10, if some edges of $\mathcal{G}(O,D)$ contribute in computing the Minimax K-nearest neighbors of v (in addition to the edges which meet v), then v has the same type of neighborhood as some other nodes in $\mathcal{G}$. Therefore, it is not labeled as an outlier.

This analysis suggests an algorithm for simultaneously computing Minimax K-nearest neighbors and detecting if v is an outlier (Algorithm 2). For this purpose, algorithm 1 is modified to include a binary vector 90 referred to herein as the updated vector which stores the type of nearest neighborhood of each external object that is currently outside the set $\{v \cup \mathcal{NP}_T(v)\}$, i.e.,
1. $updated_i=0$, if v is the node representing the nearest neighbor of i in the set $\{v \ \mathcal{NP}_T(v)\}$.
2. $updated_i=1$, otherwise.

At the beginning, $\mathcal{NP}_T(v)$ is empty. Therefore, the updated vector is initialized by a vector of zeros. At each update step, whenever an element of vector dist 82 is updated, then the corresponding index in the updated vector 90 is set to 1. At each step of Algorithm 2, a new edge is added to the set of selected edges whose weight is $D_{p,u}$. As noted above, v can be labeled as an outlier if, i) some (at least one) of the edges are directly connected to v, and some others (at least one other) are indirectly connected to v (i.e., connected to v by at least one intervening edge), and ii) no indirect edge weight represents a Minimax distance from the respective dataset object to v, i.e., the minimum value of the edge weights of those edges in the set directly connected to v (stored in min_direct) is larger than the maximum of the edge weights of the edges in the set that are not connected to v (stored in max_indrct). The latter corresponds to the condition that $D_{v,p}^{MM} > D_{p,u}$. Therefore, whenever the nearest neighbor of $\{v \cup \mathcal{NP}_T(v)\}$ is selected in the extension step, the updated status of the new member is evaluated: if $updated_{min\_ind}=1$, then max_indrct is replaced by max(max_indrct, $dist_{min\_ind}$). On the other hand, if $updated_{min\_ind}=0$, then min_direct is replaced by min(min_direct, $dist_{min\_ind}$). Finally, at the end, if min_direct>max_indrct and max_indrct≠-1 (max_indrct is initialized by -1; this condition ensures that at least one indirect edge has been selected), then v is labeled as an outlier.

This is illustrated in FIG. 8. Suppose that a set of K=4 nearest neighbors is being identified. Suppose node 92 is added to the set of nearest neighbors first and then node 94, adding edges 96 and 98 to the set of edges. Node 94 happens to be the same distance as node 92 from node v, so it is also directly connected to v. The next nearest neighbor to be added may be node 100. Its nearest neighbor in the current set of nearest neighbors plus v $\{v \cup \mathcal{NP}_T(v)\}$ is node 92, so its edge 102 connecting it to the closest member of $\{v \cup \mathcal{NP}_T(v)\}$ is indirectly connected to v via node 92. The next nearest neighbor to be added to $\mathcal{NP}_T(v)$ may be node 104. Its nearest neighbor in $\{v \cup \mathcal{NP}_T(v)\}$ is node 94, so its edge 106 connecting it to the closest member of the set $\{v \cup \mathcal{NP}_T(v)\}$ (i.e., nodes 42, 92, 94, 100) is indirectly connected to v via node 92. One the set of nearest neighbors 92, 94, 100, 104, has been identified, it can be seen that condition 1 is met: at least one of the edges (edges 96, 98) in the set of edges (96, 98, 102, 106) is directly connected to the test object 42, and at least one of the edges (edges 102 and 106) is indirectly connected to the test object, and condition 2 is met: none of the indirectly connected edges 102 and 106 has a weight which represents a Minimax distance of the respective dataset object 100, 104 to the test object 42, since the Minimax distances for these two nodes are represented by edges 96 and 98, respectively.

Algorithm 2 describes the procedure in detail. It can be seen that compared to Algorithm 1, steps 11-15 are added for keeping the information about the direct and indirect edge weights (i.e., updating max_indrct and min_direct). An additional step in line 20 is added for updating the type of connection of external nodes to the set $\{v \cup \mathcal{NP}_T(v)\}$, and finally checking if v is an outlier.

As will be appreciated, the aim is not necessarily to provide best outlier detection algorithm, rather, one which facilitates detecting if the test object could potentially be an outlier while performing K-nearest neighbor search with minimal extra computation. Then, the outcome can be subject to more sophisticated tests to validate the hypothesis.

Algorithm 2: Outlier detection

Require: Graph $\mathcal{G}^+$ (O ∪ v, D ∪ d(v, O)) including a test object v.
Ensure: A list of K Minimax nearest neighbors of v stored in $\mathcal{NP}(v)$, detecting whether v is an outlier.
  1:      Initialize vector dist by the distance of v to each object in O.
  2:      $\mathcal{NP}(v) = [\ ]$
  3: Initialize vector updated by 0.
  4: max_indrct = -1
  5: min_direct = inf
  6: for T = 1 to K do
  7:      {extension}
  8:      min_ind = arg min(dist)

-continued

Algorithm 2: Outlier detection

```
 9:        𝒩𝒫(v).append (min_ind)
10:        {update}
11:        if updated_{min_ind} = 1 then
12:            max_indrct = max(max_indrct, dist_{min_ind})
13:        else if updated_{min_ind} = 0 then
14:            min_direct = min (min_direct, dist_{min_ind})
15:        end if
16:        dist_{min_ind} = inf
17:        for i ∉ 𝒩𝒫(v) do
18:            if D_{min_ind,i} < dist_i then
19:                dist_i = D_{min_ind,i})
20:                updated_i = 1
21:            end if
22:        end for
23: end for
24: is_outlier = 0
25: if max indrct ≠ −1 and min_direct > max_indrct
    then
26:     is_outlier = 1
27: end if
28: return 𝒩𝒫(v), is_outlier
```

Algorithm 2 starts with a graph $\mathcal{G}^+$ which includes the test object v and the objects initially in graph $\mathcal{G}$, the pairwise distances D between each of the objects in graph $\mathcal{G}$ as well as the pairwise distance d between each object in $\mathcal{G}$ and test object v. The measurements D may be initially stored as a matrix, as discussed for Algorithm 1.

Step 1 includes initializing the distance vector dist 82, which stores the pairwise distance between each object in the graph $\mathcal{G}$ and test node v.

At step 1, the set $\mathcal{NP}_T(v)$ at time T=0 is initialized with an empty set.

At step 3, the outlier vector 90 is initialized (each index i having a first of two possible values, e.g., all zeros).

At step 4, the parameter max_indrct, which is the maximum value of the weights of the edges in a set of edges E that are not directly connected to v, is initialized with an initial value (e.g., of −1) (at each iteration, an edge is effectively added to the set E, the added edge connecting the added dataset object to its nearest neighbor in the current set $v \cup \mathcal{NP}_T(v)$).

At step 5, the parameter min_direct, which is the minimum of the edge weights for those edges in set E that are directly connected to v, is initialized with a high value (i.e., higher than used for initializing max_indrct, e.g., infinity inf, or some large value which is larger than the distance between the furthest objects in the graph).

At step 6, for each time (iteration) T from 1 to K, the following steps are performed to add a new node to the set $\mathcal{NP}(v)$ and then update the dist vector.

At step 7, the set of partial neighbors $\mathcal{NP}_T(v)$ is extended by one object, as described above (S112). In particular, at step 8, the node with the minimum distance arg min (dist) to the set $v \cup \mathcal{NP}_T(v)$ is identified from the dist vector. The node with the smallest dist value is set to min_ind. Then at step 9, this new node min_ind is appended to the set of nearest neighbors $\mathcal{NP}(v)$.

At step 10, the status vector updated is investigated. In particular, at step 11, if the value of the updated vector for the dataset object min_ind with the minimum distance (dist$_{min\_ind}$) to the current set $v \cup \mathcal{NP}_T(v)$ has been set to the second of the two values (updated$_{min\_ind}$=1), indicating its nearest neighbor is not v, then at step 12, the value of the parameter max_indrct is set as the maximum of the current max_indrct and the value of the distance vector for the node min_ind (dist$_{min\_ind}$). Otherwise, at step 14, the value of the parameter min_direct is set as the minimum of the current min_direct and the dist$_{min\_ind}$. Step 15 ends the if loop.

At step 16, the distance dist$_i$ for the newly-selected object is set to infinity (so that it will not be selected again). Then at step 17, for each dataset object which is not currently in the set of partial neighbors $\mathcal{NP}_T(v)$, if the distance $D_{min\_ind,i}$ from that dataset object to the dataset object new_ind most recently added to the current set $\mathcal{NP}_T(v)$ is less than dist$_i$, i.e., its nearest neighbor in the set $v \cup \mathcal{NP}_T(v)$ is min_ind, then at step 19, the dist$_i$ for this object is set to $D_{min\_ind,i}$ and at step 20, the position of i in the vector updated$_i$ is set to 1. Otherwise, if $D_{min\_ind,i}$ is not less than dist$_i$, i.e., its nearest neighbor in the set $v \cup \mathcal{NP}_T(v)$ is not min_ind there is no change to dist$_i$ for this object.

The inner loops are then ended and when the set K has been identified at step 23, then at step 24, the value of is_outlier is initialized to 0. At step 25, if the two conditions max indrct≠−1 and min_direct>max_indrct are both true, then the value of is_outlier is set to 1, i.e., the node v is predicted to be an outlier, otherwise, the value of is_outlier remains at 0, i.e., the node v is not predicted to be an outlier. At step 28, the set of nearest neighbors and the outlier prediction is output.

Computational Complexity of Algorithm 2

The extension step is done in $\mathcal{O}(N)$ via a sequential search. Lines 11-15 are constant and the added the loop 17-22 requires $\mathcal{O}(N)$ time. Thus, the theoretical overall runtime is $\mathcal{O}(N)$ which is identical to a standard K-nearest neighbor search over arbitrary graphs.

Without intending to limit the scope of the exemplary embodiment, the following Examples illustrate the application of the method to large datasets.

EXAMPLES

The effectiveness and performance of the exemplary method on a variety of real-world datasets is evaluated and the results compared against alternative methods.

Experiments are performed on seven datasets, four of which are text documents selected from the 20 Newsgroup collection (Thomas M. Mitchell, "Machine Learning," McGraw-Hill, Inc., New York, N.Y., USA, 1st edition, 1997) and the others come from image and plant specification. They are:
1. COMP: a subset of the 20 Newsgroup collection containing 2936 documents focusing on computers: 'comp.graphics,' 'comp.os.ms-windows.misc,' 'comp.sys.ibm.pc.hardware,' 'comp.sys.mac.hardware,' and 'comp.windows.x'.
2. REC: a subset of the 20 Newsgroup collection containing 2389 documents on sports: 'rec.autos,' 'rec.motorcycles,' 'rec.sport.baseball,' and 'rec.sport.hockey'.
3. SCI: a subset of the 20 Newsgroup collection containing 2373 documents about science: 'sci.crypt,' 'sci.electronics,' 'sci.med,' and 'sci.space'.
4. TALK: a subset of the 20 Newsgroup collection containing 1952 documents related to talk: 'talk.politics.guns,' 'talk.politics.mideast,' 'talk.politics.misc,' and 'talk.religion.misc'.
5. IRIS: a common dataset with 150 samples from three species 'Iris setosa,' 'Iris virginica,' and 'Iris versicolor'.
6. DGTS: each data point is an 8×8 image of a digit, i.e., 64 dimensions, with a class for each of the 10 digits (about 180 samples for each class, 1797 digits in total).

7. OLVT: the Olivetti faces dataset from AT&T, which contains pictures of 40 individuals from each 10 pictures. The dimensionality is 4096.

These datasets are publicly accessible e.g., via sklearn .datasets. For the 20 Newsgroup datasets, vectors are obtained based on the words of the document, after eliminating stop words. Cosine similarity is generally a better choice for textual data. Thus, for each pair of document vectors $x_i$ and $x_j$, their cosine similarity is computed and then their distance is determined by $1-\text{cosine}(x_i,x_j)$ to construct the pairwise distance matrix D. For non-textual datasets, the pairwise squared Euclidean distances are computed directly. A graph g⁰, D) is then constructed.

Experiments using Algorithm 1

Since the method in Kim 2013 is not applicable to cosine-based distances, the exemplary method using Algorithm 1 (referred to as PTMM) is compared against the following methods:
1. STND: Standard K-NN with the basic pairwise distance measure D.
2. MPMM: Minimax K-NN in Kim 2007.
3. Link: Link-based K-NN based on shortest distance algorithm (see, Dijkstra 1959).

It may be noted that PTMM and MPMM yield the same results. They differ only in the way they compute the Minimax nearest neighbors of v. Therefore, they are compared only with respect to running time. $L^+$ (Fouss 2012; Yen 2008) is an alternative link-based method computed based on the pseudo inverse of the Laplacian matrix. The $L^+$ method was not included in the comparisons because it has two main deficiencies: i) it is very slow—as mentioned earlier, its run time is $\mathcal{O}(N^3)$ (see also Table 1 for runtime results on 20 news group datasets), and ii) in the way that it is used (see, e.g., Yen 2008; Kim 2013), in particular, $L^+$ is computed for all data, including training and test objects, i.e., the test objects are not completely separated, rather they participate in the training process.

Accuracy of the methods is computed in a leave-one-out way, i.e., the i-th object is left out and its label is predicted using the other objects. In the final voting, the nearest neighbors are weighted according to their cosine similarity with the test object. The accuracy is calculated by averaging over all N objects.

FIGS. 11-18 provide comparisons of accuracy and runtime (in seconds) of the different methods on four different 20 news group datasets (the x-axis shows K, the number of nearest neighbors). PTMM is always the best choice in terms of accuracy and is only slightly slower than the standard approach. The algorithm for computing the Minimax distances (i.e., PTMM) is significantly faster than MPMM. PTMM is only slightly slower than the standard method and is even slightly faster than Link. The main source of computational inefficiency for MPMM comes from requiring an MST which needs $\mathcal{O}(N^2)$ runtime. PTMM theoretically has the same complexity as STND (i.e. $\mathcal{O}(N)$) and in practice performs only slightly slower. This is due to one additional update step. $L^+$ is considerably slower, even compared to MPMM, as shown in TABLE 1. This study demonstrates the effectiveness and performance of Minimax K-nearest neighbor classification with a pairwise distance measure based on cosine similarity, a measure found to be more appropriate for text data. As mentioned earlier, the previous studies (Kim 2007; Kim 2013) have always used Euclidean distance as the pairwise distance measure.

TABLE 1

Runtime (in seconds) of computing $L^+$ for different 20 news group datasets

| dataset | COMP | REC | SCI | TALK |
| --- | --- | --- | --- | --- |
| runtime | 20.67 | 12.93 | 11.84 | 6.55 |

FIGS. 19-24 provide comparisons of accuracy and runtime (in seconds) of the different methods on three non-textual datasets (IRIS, OLVT, and DGTS) (the x-axis shows K). The Minimax measure is still the best choice and the algorithm runs much faster than MPMM and only slightly slower than STND. This demonstrates the generality of the algorithm to other domains.

The scalability of different methods on larger datasets from two-moons data (see, Kim 2013) was also studied. As has been shown in Kim 2013, only $L^+$ and Minimax distance measures perform correctly on this data, which has nonlinear geometric structure. TABLE 2 compares the runtime of these methods for K=5. PTMM performs significantly faster than the alternatives, e.g., it is three times faster than MPMM and 250 times faster than $L^+$ for 10,000 objects.

TABLE 2

Runtime (in seconds) of different methods on two-moon datasets

| size | 5,000 | 10,000 | 15,000 | 20,000 |
| --- | --- | --- | --- | --- |
| PTMM | 1.03 | 4.42 | 10.96 | 19.187 |
| MPMM | 2.43 | 13.15 | 34.72 | 58.48 |
| $L^+$ | 107.61 | 1105.13 | 2855.1 | 6603.16 |

These examples are mainly focused on improvement of K-nearest neighbor classification, i.e., how the use of Minimax distances can improve the pairwise distance for K-NN search.

In another study, the exemplary method (PTMM) is compared against two other commonly used classification methods: i) Support Vector Machines (SVM) (Cortes, et al., "Support-vector networks," Mach. Learn., 20(3):273-297, 1995), and ii) Logistic Regression (LogReg) (D. A. Freedman, "Statistical Models: Theory and Practice," Cambridge University Press, 2009). As mentioned earlier, these methods require a training step. Therefore, the data is split, using 50% for training and the remaining 50% for testing. The split is performed 10 times. Tables 3 and 4 show the accuracy results for SVM, LogReg, and PTMM, respectively for the non-textual and 20 news group datasets. For each method, the optimal configuration is selected. For example, for SVM, different kernels are evaluated to select the best choice. Except for IRIS, a linear kernel gives the best results, as the datasets are very high-dimensional. For IRIS, an RBF kernel is a better choice. It can be seen that PTMM gives the best results for all datasets. For other ratios of train and test subsets, consistent results are observed, i.e., PTMM still works better.

TABLE 3

Comparison of accuracy of different methods on non-textual datasets

| dataset | IRIS | DGTS | OLVT |
|---|---|---|---|
| SVM | 0.948 | 0.929 | 0.922 |
| LogReg | 0.952 | 0.928 | 0.900 |
| PTMM | 0.993 | 0.990 | 0.958 |

TABLE 4

Comparison of accuracy of different methods on 20 news group datasets

| dataset | COMP | REC | SCI | TALK |
|---|---|---|---|---|
| SVM | 0.771 | 0.857 | 0.886 | 0.773 |
| LogReg | 0.828 | 0.922 | 0.928 | 0.926 |
| PTMM | 0.856 | 0.931 | 0.938 | 0.957 |

SVM and LogReg both require a training phase, i.e., the dataset is split into train and test subsets. Thus, computing the accuracy via a leave-one-out approach entails training the model for N times, which is computationally very heavy. However, K-NN does not need such a phase. Tables 5 and 6 compare the results on non-textual datasets where a leave-one-out approach is used for these two methods. It can be observed that the accuracy for SVM and LogReg is still lower than for PTMM (Table 5). Additionally, since the models are trained for N times, the runtime is significantly slower as compared to PTMM (compare Table 6 with FIGS. 14-19). In all experiments, the SVM and LogReg implementations from scikit-learn.org were used.

TABLE 5

Accuracy of SVM and LogReg on non-textual datasets when using a leave-one-out approach

| dataset | IRIS | DGTS | OLVT |
|---|---|---|---|
| SVM | 0.973 | 0.952 | 0.942 |
| LogReg | 0.96 | 0.948 | 0.935 |
| PTMM | 0.993 | 0.990 | 0.958 |

TABLE 6

Runtime (in seconds) of SVM and LogReg on nontextual datasets when using a leave-one-out approach

| dataset | IRIS | DGTS | OLVT |
|---|---|---|---|
| SVM | 1.13 | 274.88 | 8946.12 |
| LogReg | 0.21 | 2385.46 | 8574.53 |

These methods are considerably slower than PTMM, due to the lengthy training phase.

The results suggest that the Minimax K-nearest neighbor search is applicable to any distance measure. The algorithm, which computes the next nearest neighbor in two steps-extension and update, is significantly faster than the alternative methods, including the message passing method which requires more visits of objects and as well as computing a complete minimum spanning tree over the graph. Experiments on Outlier Detection with Algorithm 2

Algorithm 2 is evaluated for detecting outliers while performing K-nearest neighbor search. Experiments are run on the four text datasets, i.e., on COMP, REC, SCI, and TALK. The unused documents of the 20 news group collection is added to each dataset to play the role of outliers or the mismatching data source. This outlier dataset consists of the 1,664 documents of 'alt.atheism', 'misc.forsale', and 'soc.religion.christian' categories. For each document, either from the train or from outlier set, its K nearest neighbors is computed only from the documents of train dataset and a prediction is made of whether it is an outlier or not (using Algorithm 2).

Algorithm 2 (referred to as PTMMout) is compared against two other methods described above: STND and Link. These two algorithms do not directly provide outlier prediction. Therefore, in order to perform a fair comparison, a Prim minimum spanning tree is computed over the set containing v and the objects selected by the K-NN search, where v is the initial node. Then the same conditions are checked to determine whether v is determined as an outlier. These two variants are referred to respectively as STNDout and LINKout.

The rate of correct outlier prediction for the outlier dataset, rate_1, is defined as the ratio of the number of correct outlier reports to the size of this set. However, an algorithm may report an artificially high outlier number. Therefore, similar to the precision-recall trade-off, a ratio, denoted rate_2, of the number of non-outlier reports to the total size of train dataset is computed. Additionally, similar to the F-measure, the harmonic average of rate_1 and rate_2, denoted o_rate, is computed, i.e.:

$$o\_rate = 2 \cdot \frac{rate\_1 \cdot rate\_2}{rate\_1 + rate\_2}. \quad (6)$$

FIGS. 24-27 show o_rate results for different values of K and for different text datasets when PTMMout, STNDout and LINKout are used to predict whether the members of train and outlier datasets are outlier or not.

For all datasets, it is observed that PTMMout yields a significantly higher o_rate compared to the other algorithms. Moreover, the o_rate of PTMMout is fairly stable and constant over different values of K, i.e., the choice of an optimal K is much less critical than for other methods. For STNDout and LINKout, the o_rate is maximal for only a fairly small range of K (e.g., between 30 and 50) and then it sharply drops down to zero.

Figure 28:
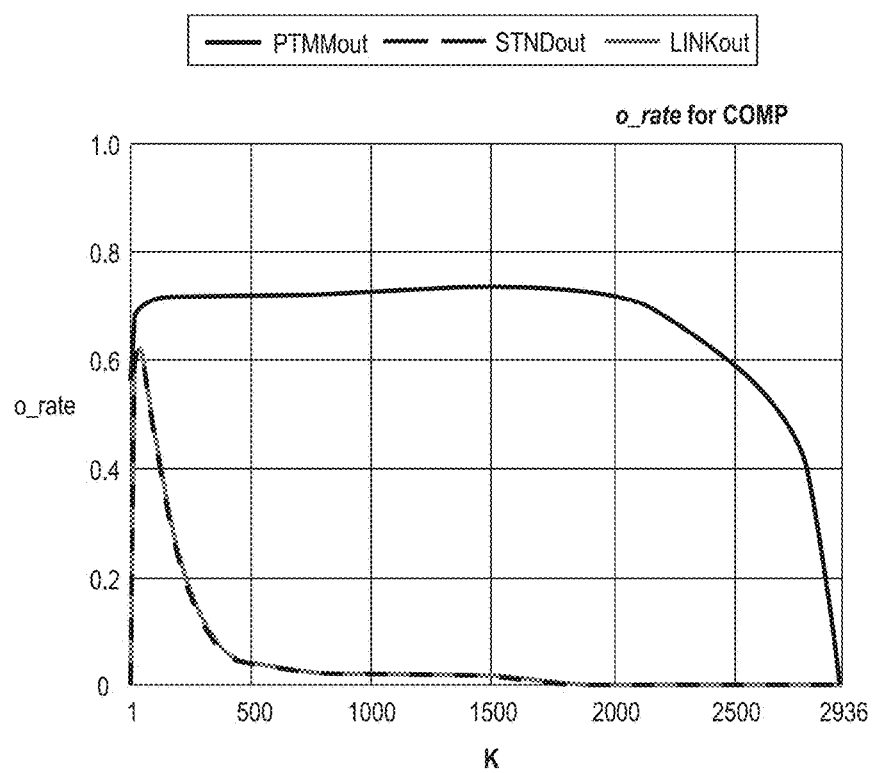
Figure 29:
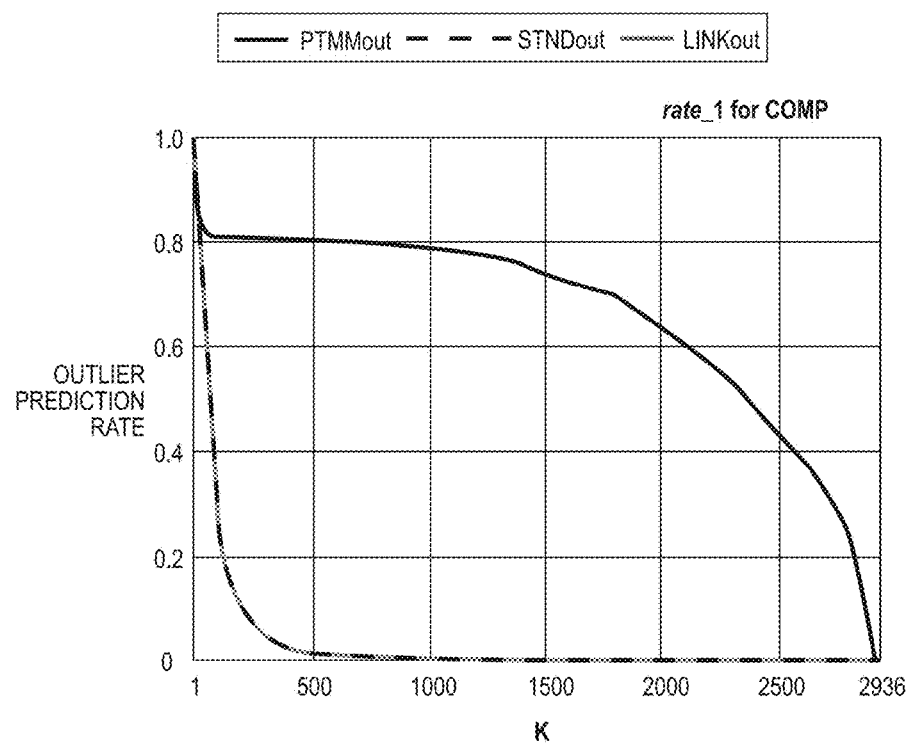
FIGS. 29-30 show an analysis of rate 1 and rate 2 for the COMP dataset.
Figure 30:
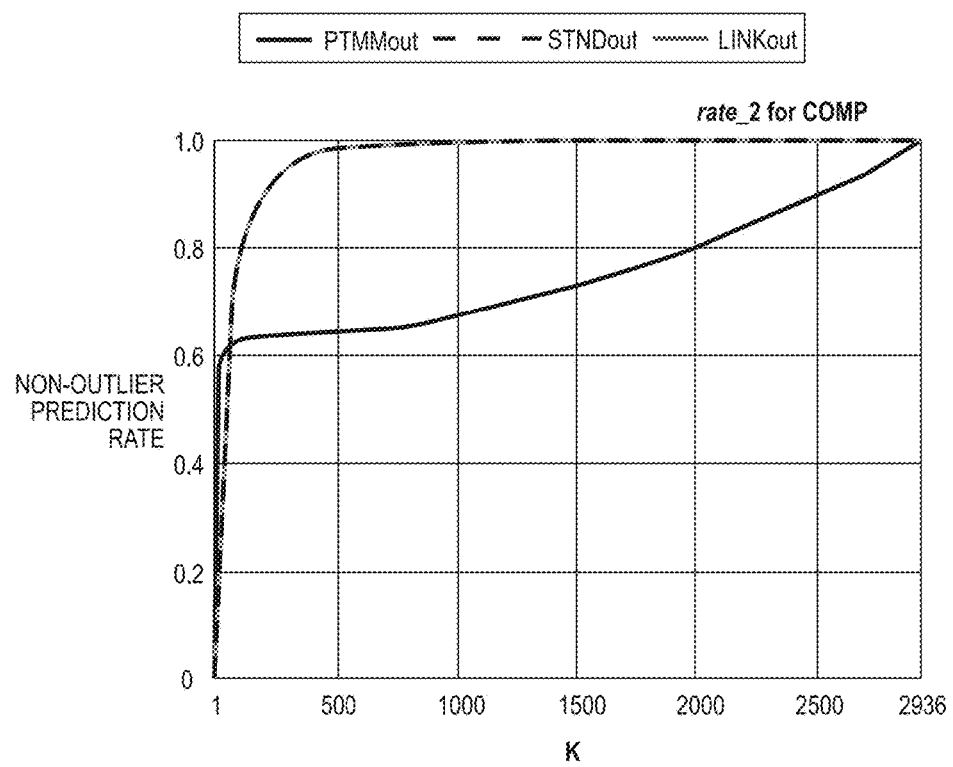
Figure 31:
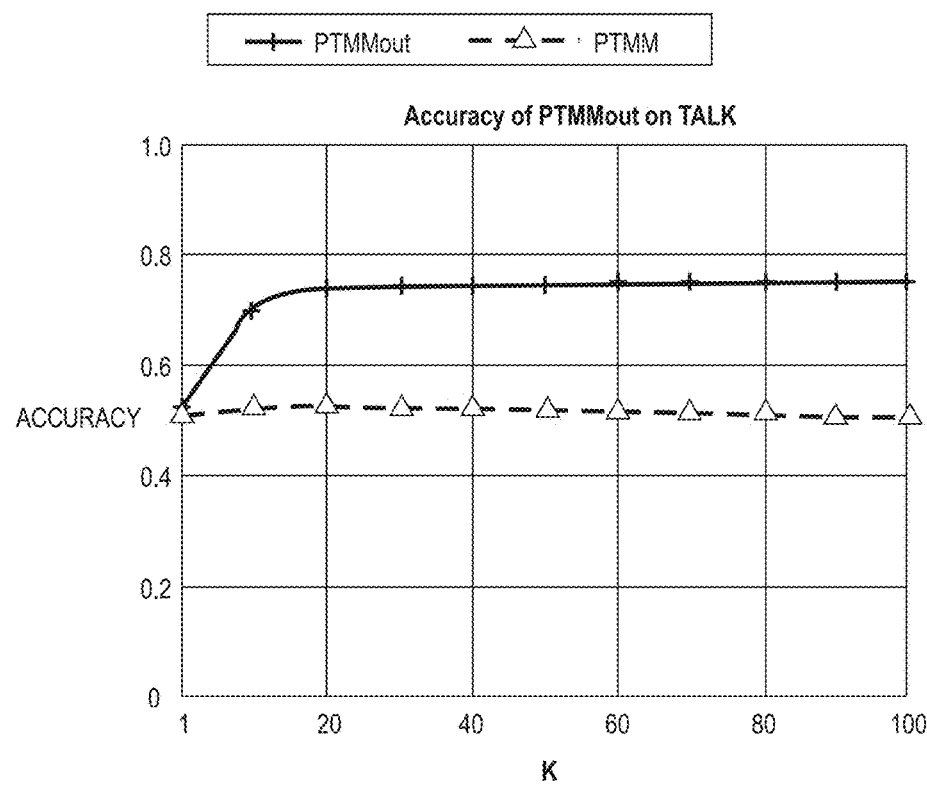
FIGS. 31-34 show accuracy of the method with and without outlier detection for different 20 news group data sets, when the test objects contain outliers.
Figure 32:
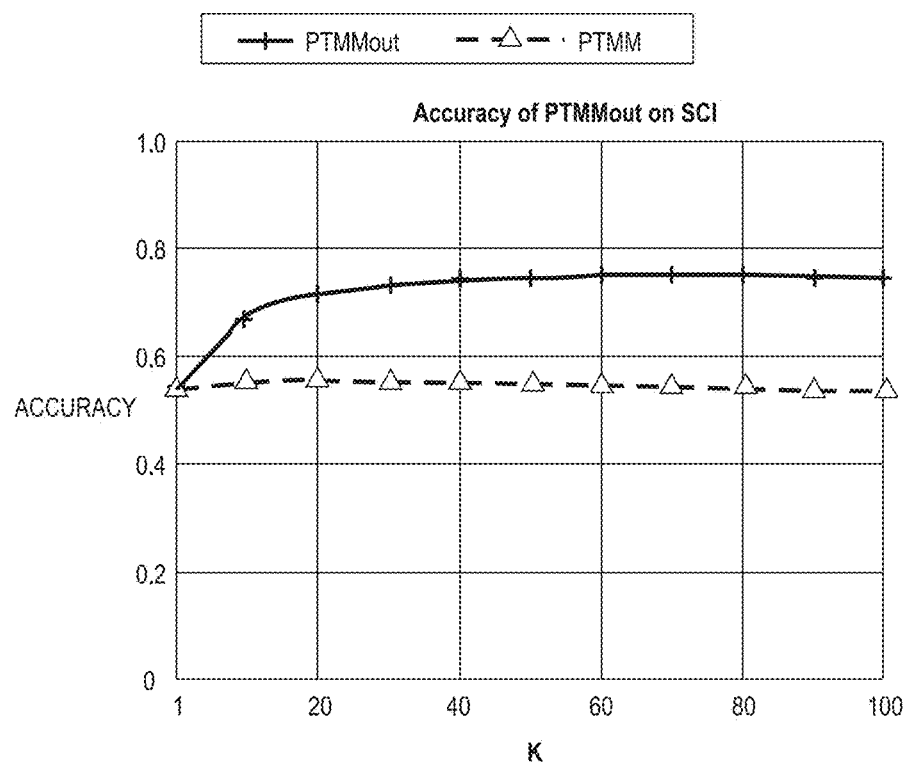
Figure 33:
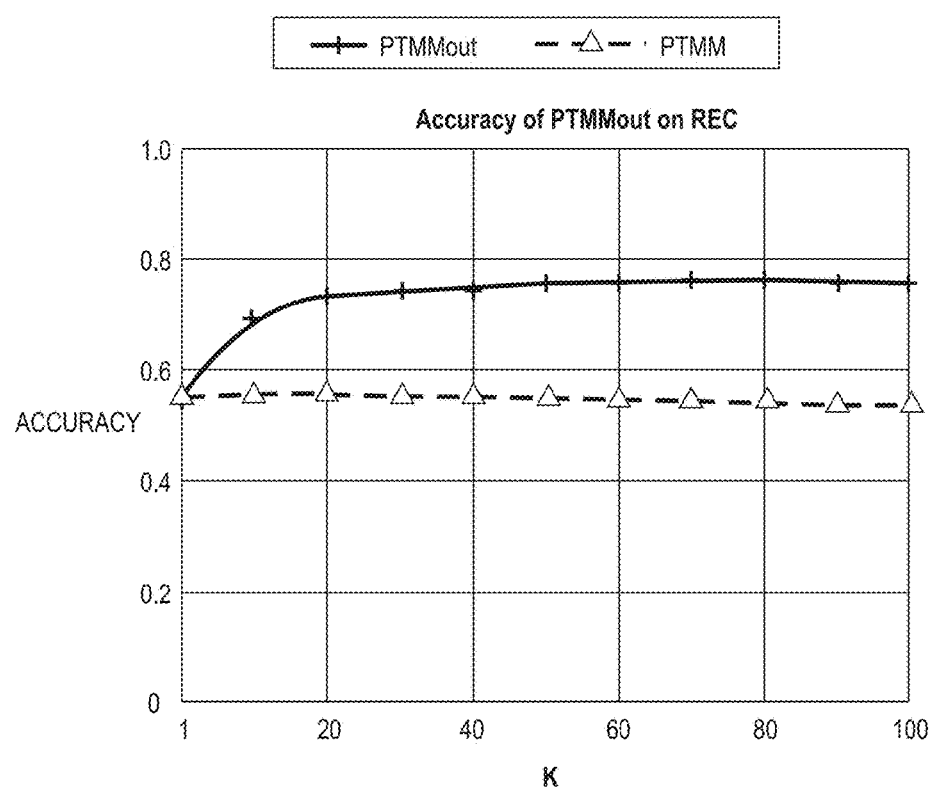
Figure 34:
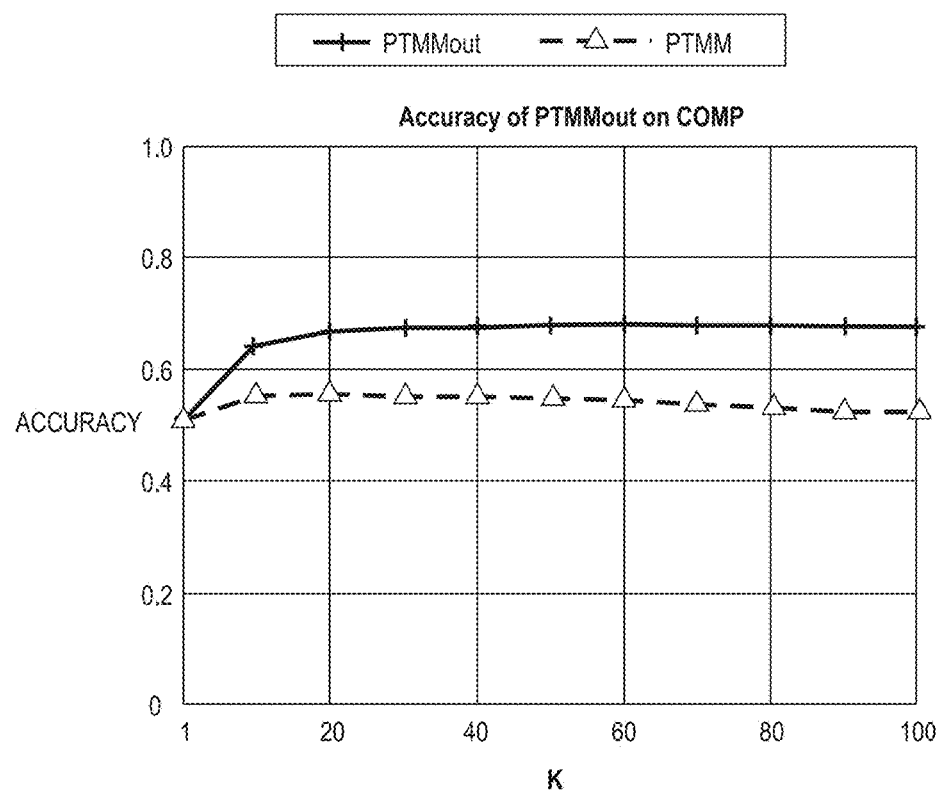

FIGS. 28-29 illustrate an in-depth analysis of rate_1 and rate_2 for the COMP dataset. STNDout and LINKout have a strong bias for reporting an object as non-outlier, even though it might be an outlier.

Generally, as K is increased, rate_1 decreases but rate_2 increases. The reason is that as more neighbors in $\mathcal{NP}(v)$ are involved, then the chance of having an edge whose both sides are inside $\mathcal{NP}(v)$ and its weight represents a Minimax distance increases. This case may occur when $\mathcal{NP}(v)$ contains objects from more than one class. Therefore, the probability that an object is labeled as a non-outlier increases. However, this transition is very sharp for STNDout and LINKout, such that for a relatively small K they label every object (either from the train set or from the outlier set) as a non-outlier. Moreover, as mentioned above, even for small K, STNDout and LINKout yield significantly lower o_rate than PTMMout. The method provides a mechanism for proposing if the new object could potentially be an outlier while performing K-nearest neighbor search with minimal extra computation. An object suspected of being an outlier could then be investigated by more advanced outlier-detection methods.

In the previous experiments, it was assumed that the test dataset comes from the same source as the train data, i.e., it does not contain any outlier or a new class. However, in reality, train and test datasets may have some discrepancies, i.e., some test objects may just be outliers or may belong to new classes.

The exemplary outlier detection variant, i.e., the PTM-Mout algorithm, outperforms even the PTMM algorithm when the test data contains outliers or objects from other sources. In a leave-one-out way, the label of each document (either from train set or from the outlier set) is predicted, using only the train dataset. Then, the predicted label is compared with the correct label and the accuracy is computed. FIGS. 31-34 compare the accuracy of PTMMout compared to PTMM of different 20 news group data (TALK, SCI, REC, and COMP), when the test objects contain outliers. Empowering PTMM with an outlier detection mechanism improves the accuracy significantly.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for identifying a set of nearest neighbors for a test object and predicting whether the test object is an outlier, the method comprising:
   receiving a test object;
   for each of a set of dataset objects, computing a pairwise distance between the test object and the dataset object, the dataset objects and test object being represented by nodes of a graph, edges of the graph representing pairwise distances between respective pairs of the objects;
   with a processor, iteratively selecting one of the dataset objects to add to a set of nearest neighbors until the set of nearest neighbors includes a predefined number of nearest neighbors, the selected dataset object at each iteration being a dataset object min_ind which is not currently in the set of nearest neighbors for which there is no other dataset object not currently in the set of nearest neighbors which has a smaller pairwise distance to any of a subset of objects than the selected dataset object, the subset of objects consisting of the test object and the dataset objects currently in the set of nearest neighbors;
   predicting whether the test object is an outlier with respect to the dataset, including:
     initializing a vector dist with the distance of the test object to each object in the dataset;
     initializing a value max_indrct with an initial value;
     initializing a value min_direct with an initial value greater than the initial value of max_indrct;
     initializing an updated vector with a first of two values for each of the objects in the dataset;
     and wherein at each iteration:
       if the value of the updated vector for min_ind has been set to a second of the two values, then the value max_indrct is set to a maximum of a current value of max_indrct and $dist_{min\_ind}$, otherwise the value min_direct is set to a minimum of the current value of min_direct and $dist_{min\_ind}$, where $dist_{min\_ind}$ is the value of the distance vector for the object min_ind in the dataset that is not yet in the set of nearest neighbors, which has the minimum distance to the test object, and
       for each dataset object not currently in the set of nearest neighbors, if a distance $D_{min\_ind,i}$ is less than the distance for that object stored in the vector dist, then the distance for that object stored in the vector dist is set to the distance $D_{min\_ind,i}$, and the value of the updated vector for that dataset object is set to the second of the two values, where $D_{min\_ind,i}$ is the distance between that dataset object and the newly-added member of the set of nearest neighbors;
     the test object being predicted to be an outlier if max_indrct is not equal to its initial value and min_direct is greater than max_indrct, and
   outputting at least one of:
     the set of nearest neighbors; and
     information based thereon, the information including a prediction of whether the test object is an outlier with respect to the dataset.

2. The method of claim 1, wherein the method further comprises assigning a label or label distribution to the test object based on labels of the dataset objects in the set of nearest neighbors and wherein the output information comprises the assigned label or label distribution.

3. The method of claim 1 wherein each of the dataset objects is associated with a label selected from a predefined set of labels or a probability distribution over the predefined set of labels.

4. The method of claim 1, wherein the dataset objects and test object are vectorial representations of text documents or images.

5. The method of claim 4, wherein the computed pairwise distance between the test object and the dataset object is based on a cosine similarity between respective vectorial representations of the objects.

6. The method of claim 1, wherein the computed pairwise distance is selected from distance measures based on the cosine similarity, the Euclidean distance, the Mahalanobis distance, the Pearson correlation, the Hamming distances and the edit distance.

7. The method of claim 1, wherein at least some of the pairwise distance between respective pairs of the dataset objects are computed with a same distance measure as the computed pairwise distances between the test object and the dataset objects.

8. The method of claim 1, wherein the method includes, at each iteration, updating a distance vector, the distance vector including, for each object not currently in the subset of objects, a minimum of the pairwise distances to the objects currently in the subset.

9. The method of claim 1, wherein the set of nearest neighbors is the set of K dataset objects represented in the graph whose Minimax distances from the test object are not larger than for the objects in the graph that are not in the set of K nearest neighbors.

10. The method of claim 1, wherein only a single dataset object is added to the set of nearest neighbors at each iteration.

11. The method of claim 1, further comprising generating the graph.

12. The method of claim 1, further comprising receiving the graph, and wherein for each pair of nodes representing dataset objects that are not connected by an edge, setting the pairwise distance between the nodes to a maximum pairwise distance.

13. The method of claim 1, wherein the method is performed without directly computing Minimax distances from the test object to objects in the graph.

14. The method of claim 1, wherein the information output includes a prediction of whether the test object is an outlier with respect to the dataset.

15. A method for predicting whether a test object is an outlier with respect to a dataset of objects, comprising:
  receiving a test object;
  for each of a set of dataset objects, computing a pairwise distance between the test object and the dataset object, the dataset objects and test object being represented by nodes of a graph, edges of the graph representing pairwise distances between respective pairs of the objects,
  identifying a partial set of nearest neighbors from the objects in the dataset for which there does not exist an object in the dataset minus the partial set for which a Minimax distance between the test object and each object in the partial set of nearest neighbors is less than the Minimax distance between the test object and each object which has been added to the partial set of nearest neighbors, the Minimax distance for a pair of nodes in the graph being computed along a Minimax path, the Minimax path being a path between the pair of nodes in which a largest pairwise distance between any two nodes on the path is smaller than for all other paths between the pair of nodes, the Minimax distance being the largest pairwise distance;
  with a processor, starting with the partial set of nearest neighbors, iteratively selecting one of the dataset objects to add to a set of nearest neighbors until the set of nearest neighbors includes a predefined number of nearest neighbors, the selected dataset object at each iteration being a dataset object which is not currently in the set of nearest neighbors for which there is no other dataset object not currently in the set of nearest neighbors which has a smaller pairwise distance to any of a subset of objects than the selected dataset object, the subset of objects consisting of the test object and the dataset objects currently in the set of nearest neighbors, wherein at each iteration, an edge is added to a set of edges, the added edge connecting the added dataset object to its nearest neighbor in the current set of nearest neighbors plus the test object, and wherein when the set of nearest neighbors includes the predefined number of nearest neighbors, the test object is predicted to be an outlier if:
    i) at least one of the edges in the set of edges is directly connected to the test object, and at least one of the edges is indirectly connected to the test object, and
    ii) none of the indirectly connected edges has a weight which represents a Minimax distance of the respective dataset object to the test object; and
  outputting at least one of:
    the set of nearest neighbors; and
    whether the test object is predicted to be an outlier.

16. A computer program product comprising a non-transitory recording medium storing instructions, which when executed on a computer, cause the computer to perform the method of claim 1.

17. A system comprising memory which stores instructions, and a processor in communication with the memory for executing the instructions, wherein the instructions are to perform the method of claim 1.

18. A system for identifying a set of nearest neighbors comprising:
  a graph generation component which, for each of a set of dataset objects, computes a pairwise distance between a test object and the dataset object;
  an extension component which iteratively selects one of the dataset objects to add to a set of nearest neighbors until the set of nearest neighbors includes a predefined number of nearest neighbors, the selected dataset object at each iteration being a dataset object which is not currently in the set of nearest neighbors for which there is no other dataset object not currently in the set of nearest neighbors which has a smaller pairwise distance to any of a subset of objects than the selected dataset object, the subset of objects consisting of the test object and the dataset objects currently in the set of nearest neighbors;
  a prediction component which predicts whether the test object is an outlier with respect to the dataset, the test object being considered an outlier when two conditions are met:
    1) in a graph which includes an edge for each of the dataset objects added to the set of nearest neighbors to its nearest neighbor in the current subset of objects, each edge having a weight representing a pairwise distance between the objects connected by the edge, at least one of the edges is directly connected to the test object and at least one of the edges is indirectly connected to the test object, and
    2) none of the indirectly connected edges has a weight which represents a Minimax distance of the respective dataset object to the test object, the Minimax distance being the Minimax distance for a pair of nodes in the graph being computed along a Minimax path, the Minimax path being a path between the pair of nodes in which a largest pairwise distance between any two nodes on the path is smaller than for all other paths between the pair of nodes, the Minimax distance being the largest pairwise distance; and
  an output component which outputs at least one of:
    the set of nearest neighbors; and
    a prediction of whether the test object is an outlier with respect to the dataset; and
  a processor which implements the graphing component and the extension component.

19. The system of claim 18, further comprising:
  an update component which, at each iteration, updates a distance vector, the distance vector including, for each dataset object not currently in the subset of objects, a minimum of the pairwise distances to the objects currently in the subset.

20. The system of claim 18, wherein the graph generation component, for each of the set of dataset objects, provides a pairwise distance between the dataset object and each of the other dataset objects.

21. A method for identifying a set of nearest neighbors which have Minimax distances to a test object, the method comprising:
  for each of a set of dataset objects in which each pair of dataset objects is associated with a pairwise distance, computing a pairwise distance between a test object and the dataset object, the dataset objects and test object being represented by nodes of a graph, edges of the graph representing pairwise distances between respective pairs of the objects;

identifying a partial set of nearest neighbors from the objects in the dataset for which there does not exist an object in the dataset minus the partial set for which a Minimax distance between the test object and each object in the partial set of nearest neighbors is less than the Minimax distance between the test object and each object which has been added to the partial set of nearest neighbors, the Minimax distance for a pair of nodes in the graph being computed along a Minimax path, the Minimax path being a path between the pair of nodes in which a largest pairwise distance between any two nodes on the path is smaller than for all other paths between the pair of nodes, the Minimax distance being the largest pairwise distance;

with a processor, starting with the partial set of nearest neighbors, for a predefined number of iterations, iteratively selecting one of the dataset objects to add to a set of nearest neighbors until the set of nearest neighbors includes the predefined number of nearest neighbors, the selected dataset object at each iteration being a dataset object which is not currently in the set of nearest neighbors for which there is no other dataset object not currently in the set of nearest neighbors which has a smaller pairwise distance to any of a subset of objects than the selected dataset object, the subset of objects comprising the test object and the dataset objects currently in the set of nearest neighbors, whereby when the set of nearest neighbors reaches the predefined number of nearest neighbors, the set of nearest neighbors is the set of dataset objects represented in the graph whose Minimax distances from the test object are not larger than for the objects in the graph that are not in the set of nearest neighbors; and outputting at least one of:
the set of nearest neighbors; and
a prediction of whether the test object is an outlier with respect to the set of dataset objects.

* * * * *